US010525832B2

(12) United States Patent
Zhao

(10) Patent No.: US 10,525,832 B2
(45) Date of Patent: *Jan. 7, 2020

(54) BATTERY AND UNMANNED AERIAL VEHICLE WITH THE BATTERY

(71) Applicant: SZ DJI TECHNOLOGY CO., LTD., Shenzhen (CN)

(72) Inventor: Tao Zhao, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/044,349

(22) Filed: Jul. 24, 2018

(65) Prior Publication Data
US 2019/0061540 A1  Feb. 28, 2019

Related U.S. Application Data

(63) Continuation of application No. 15/417,168, filed on Jan. 26, 2017, which is a continuation of application
(Continued)

(30) Foreign Application Priority Data

Dec. 6, 2013 (CN) .......................... 2013 1 0659214

(51) Int. Cl.
H02J 7/00 (2006.01)
B60L 11/18 (2006.01)
B64C 39/02 (2006.01)

(52) U.S. Cl.
CPC ........ B60L 11/1822 (2013.01); B64C 39/024 (2013.01); H02J 7/0026 (2013.01);
(Continued)

(58) Field of Classification Search
CPC ................... H02J 7/0063; H02J 7/0065; H02J 2007/0067; G01R 31/3606; G01R 31/361; G01R 31/3613; G01R 36/3617
(Continued)

(56) References Cited

U.S. PATENT DOCUMENTS 5,325,041 A * 6/1994 Briggs ............... G01R 31/3828
320/149
5,563,496 A 10/1996 Mcclure
(Continued)

FOREIGN PATENT DOCUMENTS

CN 87101588 A 11/1987
CN 1267927 A 9/2000
(Continued)

OTHER PUBLICATIONS

Examination Decision of Request for Invalidation, *Liao Rui v. SZ DJI Technology Co., Ltd.* Case No. 5W112926 (App. No. 201320802925.9), Patent Reexamination Board, State Intellectual Property Office of the People's Republic of China, Mar. 5, 2018., 31 pages (incl. translation).
(Continued)

*Primary Examiner* — David V Henze-Gongola
(74) *Attorney, Agent, or Firm* — Anova Law Group, PLLC

(57) ABSTRACT

The disclosure provides a battery which can include a power supply and power supply circuit, the power supply circuit connected to the power supply. The power supply can discharge through the power supply circuit. An electronic switch can control the power-on or off of the power supply, thereby avoiding the generation of sparks during the power on process and allowing for the normal use of the battery and the safety of the aircraft. The disclosure also provides an aircraft having the battery.

20 Claims, 11 Drawing Sheets

Related U.S. Application Data

No. 14/262,478, filed on Apr. 25, 2014, now Pat. No. 9,592,744, which is a continuation of application No. PCT/CN2014/071940, filed on Feb. 10, 2014.

(52) U.S. Cl.
CPC ....... *B60L 2200/10* (2013.01); *B60L 2260/32* (2013.01); *B64C 2201/108* (2013.01); *B64C 2201/146* (2013.01); *Y02T 10/7005* (2013.01); *Y02T 10/7044* (2013.01); *Y02T 10/7061* (2013.01)

(58) Field of Classification Search
USPC .......................................................... 320/136
See application file for complete search history.

(56) References Cited

U.S. PATENT DOCUMENTS

| | | |
|---|---|---|
| 5,606,242 A | 2/1997 | Hull et al. |
| 5,769,657 A | 6/1998 | Kondo et al. |
| 5,869,204 A | 2/1999 | Kottke et al. |
| 6,136,467 A | 10/2000 | Phelps et al. |
| 6,483,275 B1 | 11/2002 | Nebrigic et al. |
| 6,492,791 B1 | 12/2002 | Saeki et al. |
| 6,509,715 B1 | 1/2003 | LaRue |
| 6,538,413 B1 | 3/2003 | Beard et al. |
| 6,623,049 B2 | 9/2003 | Shreeve et al. |
| 6,660,427 B1 | 12/2003 | Hukill et al. |
| 7,119,459 B2 | 10/2006 | Bruwer et al. |
| 8,439,301 B1 | 5/2013 | Lussier et al. |
| 9,028,988 B2 | 5/2015 | Nakanouchi et al. |
| 9,120,560 B1* | 9/2015 | Armer ................. B64C 29/0008 |
| 9,592,744 B2* | 3/2017 | Zhao ................... B60L 11/1822 |
| 9,979,200 B2 | 5/2018 | Qiu et al. |
| 10,044,013 B2 | 8/2018 | Qiu et al. |
| 2002/0125857 A1 | 9/2002 | Mastaler et al. |
| 2003/0039880 A1 | 2/2003 | Turner |
| 2004/0001996 A1 | 1/2004 | Sugimoto |
| 2004/0021427 A1 | 2/2004 | Bruwer et al. |
| 2005/0051667 A1 | 3/2005 | Arlton et al. |
| 2005/0208344 A1 | 9/2005 | Tan |
| 2007/0012818 A1 | 1/2007 | Miyazawa et al. |
| 2007/0148532 A1 | 6/2007 | Lim et al. |
| 2007/0176735 A1 | 8/2007 | Blaker et al. |
| 2007/0200027 A1* | 8/2007 | Johnson ................ B64C 39/022 244/3.1 |
| 2007/0246610 A1 | 10/2007 | Rath et al. |
| 2008/0035786 A1* | 2/2008 | Bilyk ................... B63B 22/003 244/13 |
| 2008/0084182 A1 | 4/2008 | Oberlin et al. |
| 2008/0238370 A1 | 10/2008 | Carrier et al. |
| 2008/0241675 A1 | 10/2008 | Enari et al. |
| 2008/0268329 A1 | 10/2008 | Mackle et al. |
| 2009/0027218 A1 | 1/2009 | Yoo |
| 2009/0071737 A1 | 3/2009 | Leonard et al. |
| 2009/0072790 A1 | 3/2009 | Ibrahim |
| 2009/0079382 A1 | 3/2009 | Norimatsu et al. |
| 2009/0108803 A1 | 4/2009 | Singarajan et al. |
| 2009/0220825 A1 | 9/2009 | Nakashima et al. |
| 2010/0102945 A1 | 4/2010 | Watson et al. |
| 2010/0248583 A1 | 9/2010 | Lin |
| 2011/0063119 A1 | 3/2011 | Martin et al. |
| 2011/0071706 A1 | 3/2011 | Crumm et al. |
| 2011/0221384 A1 | 9/2011 | Scheucher |
| 2011/0301784 A1* | 12/2011 | Oakley .................. B64C 27/04 701/2 |
| 2012/0116379 A1 | 5/2012 | Yates et al. |
| 2012/0194136 A1 | 8/2012 | Johnson et al. |
| 2012/0196168 A1 | 8/2012 | Hirsch |
| 2012/0274335 A1 | 11/2012 | Matsuura |
| 2012/0300351 A1 | 11/2012 | Ikeuchi et al. |
| 2013/0102273 A1* | 4/2013 | Jung ..................... H04W 4/02 455/404.2 |
| 2013/0224528 A1* | 8/2013 | Johnson ................ B25F 5/00 429/7 |
| 2013/0229186 A1 | 9/2013 | Shiraishi et al. |
| 2013/0261914 A1 | 10/2013 | Ingram et al. |
| 2013/0297243 A1 | 11/2013 | Baba et al. |
| 2013/0308239 A1 | 11/2013 | Yamada et al. |
| 2013/0309545 A1 | 11/2013 | Daubitzer |
| 2014/0061376 A1 | 3/2014 | Fisher et al. |
| 2014/0111142 A1* | 4/2014 | Lee ........................ G06F 1/3206 320/107 |
| 2014/0117149 A1 | 5/2014 | Zhou et al. |
| 2014/0277854 A1* | 9/2014 | Jones ..................... G05D 1/102 701/3 |
| 2015/0314434 A1 | 11/2015 | Bevins et al. |
| 2016/0179096 A1 | 6/2016 | Bradlow et al. |
| 2017/0001721 A1 | 1/2017 | Saika et al. |
| 2017/0136901 A1* | 5/2017 | Zhao ................... B60L 11/1822 |

FOREIGN PATENT DOCUMENTS

| | | |
|---|---|---|
| CN | 1941957 A | 4/2007 |
| CN | 101267126 A | 9/2008 |
| CN | 101303397 A | 11/2008 |
| CN | 101436774 A | 5/2009 |
| CN | 101471581 A | 7/2009 |
| CN | 101472413 | 7/2009 |
| CN | 101551444 A | 10/2009 |
| CN | 201341028 Y | 11/2009 |
| CN | 201728641 | 2/2011 |
| CN | 201821092 U | 5/2011 |
| CN | 202190096 U | 4/2012 |
| CN | 102593898 A | 7/2012 |
| CN | 102593908 A | 7/2012 |
| CN | 102655244 A | 9/2012 |
| CN | 202487721 U | 10/2012 |
| CN | 102780246 A | 11/2012 |
| CN | 202712882 U | 1/2013 |
| CN | 102969756 A | 3/2013 |
| CN | 103023081 A | 4/2013 |
| CN | 202872350 U | 4/2013 |
| CN | 103117536 A | 5/2013 |
| CN | 203086432 U | 7/2013 |
| CN | 203104065 U | 7/2013 |
| CN | 103235602 A | 8/2013 |
| CN | 103311899 A | 9/2013 |
| CN | 103332296 A | 10/2013 |
| CN | 203277584 U | 11/2013 |
| CN | 203289165 U | 11/2013 |
| CN | 2014071940 | 2/2014 |
| CN | 203504154 U | 3/2014 |
| CN | 103701163 A | 4/2014 |
| CN | 203690968 U | 7/2014 |
| CN | 204223172 U | 3/2015 |
| CN | 204230318 | 3/2015 |
| CN | 204415738 | 6/2015 |
| CN | 204596856 U | 8/2015 |
| CN | 205376593 | 7/2016 |
| GB | 2399701 B | 7/2007 |
| JP | H10509857 | 9/1998 |
| JP | 2000270485 A | 9/2000 |
| JP | 4483751 B2 | 9/2005 |
| JP | 2007123082 A | 5/2007 |
| JP | 2008306782 | 12/2008 |
| JP | 2011182592 A | 9/2011 |
| JP | 2012095433 | 5/2012 |
| JP | 5260781 B1 | 5/2013 |
| JP | 2013226855 | 11/2013 |
| WO | 1996010858 | 4/1996 |
| WO | 2001097379 | 12/2001 |
| WO | 2011066030 A2 | 6/2011 |
| WO | 2011102338 A1 | 8/2011 |
| WO | 2013014889 | 1/2013 |

OTHER PUBLICATIONS

"Lithium Batteries—On the Basics of Remote-controlled Aircraft," Oct. 14, 2014. http://www.moz8.com/thread-59614-1-1.html.

(56) References Cited

OTHER PUBLICATIONS

"Why Electric Vehicles Adopt a Voltage of 288V," Oct. 24, 2004. http://www.china-ev.com/bbs/forum.php?mod=viewthread&tid.
Exhibit 1012, "Safety of Lithium-ion Batteries," The European Association for Advanced Rechargeable Batteries, Jun. 2013, *SZ DJI Technology Co., Ltd., v. Autel Robotics USA LLC* Petition for Post Grant Review (PGR2019-00014) Patent Trial and Appeal Board, United States Patent and Trademark Office.
Exhibit 1024, "Screenshot Phantom 2 Vision User Manual Version 1.1.1," Apr. 11, 2014., *SZ DJI Technology Co., Ltd., v. Autel Robotics USA LLC* Petition for Post Grant Review (PGR2019-00014) Patent Trial and Appeal Board, United States Patent and Trademark Office.
Patentee Conclusions following Oral Proceedings, *SZ Agatech Co., Ltd., v. SZ DJI Technology Co., Ltd.*, Case No. 5W109399 (App. No. 201320802925.9), Patent Reexamination Board, State Intellectual Property Office of the People's Republic of China, Jul. 5, 2016., 25 pages (incl. translation).
*SZ DJI Technology Co., Ltd., et al., v. Autel Robotics USA LLC, et al.*, "Autel Robotics USA LLC, et al., Initial Invalidity Contentions for U.S. Pat. No. 9,2854,040 and U.S. Pat. No. 9,592,744." C.A. No. 16-706-LPS (Consolidated) (D. Del)., Jun. 29, 2018.
Exhibit B, Table of Contents, Initial Invalidity Claim Chart, *SZ DJI Technology Co., Ltd., et al., v. Autel Robotics USA LLC, et al.*, Autel Robotics USA LLC, et al., Initial Invalidity Contentions for U.S. Pat. No. 9,284,040 and U.S. Pat. No. 9,592,744. C.A. No. 16-706-LPS (Consolidated) (D. Del)., Jun. 29, 2018.
Exhibit B-1, U.S. Pat. No. 5,606,242, Initial Invalidity Claim Chart, *SZ DJI Technology Co., Ltd., et al., v. Autel Robotics USA LLC, et al.*, Autel Robotics USA LLC, et al., Initial Invalidity Contentions for U.S. Pat. No. 9,284,040 and U.S. Pat. No. 9,592,744. C.A. No. 16-706-LPS (Consolidated) (D. Del)., Jun. 29, 2018.
Exhibit B-2, U.S. Pat. No. 6,538,413, Initial Invalidity Claim Chart, *SZ DJI Technology Co., Ltd., et al., v. Autel Robotics USA LLC, et al.*, Autel Robotics USA LLC, et al., Initial Invalidity Contentions for U.S. Pat. No. 9,284,040 and U.S. Pat. No. 9,592,744. C.A. No. 16-706-LPS (Consolidated) (D. Del)., Jun. 29, 2018.
Exhibit B-3, U.S. Pat. No. 6,483,275, Initial Invalidity Claim Chart, *SZ DJI Technology Co., Ltd., et al., v. Autel Robotics USA LLC, et al.*, Autel Robotics USA LLC, et al., Initial Invalidity Contentions for U.S. Pat. No. 9,284,040 and U.S. Pat. No. 9,592,744. C.A. No. 16-706-LPS (Consolidated) (D. Del)., Jun. 29, 2018.
Exhibit B-4, U.S. Pat. Pub. No. 20040021427, Initial Invalidity Claim Chart, *SZ DJI Technology Co., Ltd., et al., v. Autel Robotics USA LLC, et al.*, Autel Robotics USA LLC, et al., Initial Invalidity Contentions for U.S. Pat. No. 9,284,040 and U.S. Pat. No. 9,592,744. C.A. No. 16-706-LPS (Consolidated) (D. Del)., Jun. 29, 2018.
Exhibit B-5, U.S. Pub. No. 20090027218, Initial Invalidity Claim Chart, *SZ DJI Technology Co., Ltd., et al., v. Autel Robotics USA LLC, et al.*, Autel Robotics USA LLC, et al., Initial Invalidity Contentions for U.S. Pat. No. 9,284,040 and U.S. Pat. No. 9,592,744. C.A. No. 16-706-LPS (Consolidated) (D. Del)., Jun. 29, 2018.
Exhibit B-6, U.S. Pub. No. 20050208344, Initial Invalidity Claim Chart, *SZ DJI Technology Co., Ltd., et al., v. Autel Robotics USA LLC, et al.*, Autel Robotics USA LLC, et al., Initial Invalidity Contentions for U.S. Pat. No. 9,284,040 and U.S. Pat. No. 9,592,744. C.A. No. 16-706-LPS (Consolidated) (D. Del)., Jun. 29, 2018.
Exhibit B-7, U.S. Pub. No. 20120194136, Initial Invalidity Claim Chart, *SZ DJI Technology Co., Ltd., et al., v. Autel Robotics USA LLC, et al.*, Autel Robotics USA LLC, et al., Initial Invalidity Contentions for U.S. Pat. No. 9,284,040 and U.S. Pat. No. 9,592,744. C.A. No. 16-706-LPS (Consolidated) (D. Del)., Jun. 29, 2018.
Exhibit B-8, U.S. Pub. No. 20010063119, Initial Invalidity Claim Chart, *SZ DJI Technology Co., Ltd., et al., v. Autel Robotics USA LLC, et al.*, Autel Robotics USA LLC, et al., Initial Invalidity Contentions for U.S. Pat. No. 9,284,040 and U.S. Pat. No. 9,592,744. C.A. No. 16-706-LPS (Consolidated) (D. Del)., Jun. 29, 2018.
Exhibit B-9, U.S. Pub. No. 20140061376, Initial Invalidity Claim Chart, *SZ DJI Technology Co., Ltd., et al., v. Autel Robotics USA LLC, et al.*, Autel Robotics USA LLC, et al., Initial Invalidity Contentions for U.S. Pat. No. 9,284,040 and U.S. Pat. No. 9,592,744. C.A. No. 16-706-LPS (Consolidated) (D. Del)., Jun. 29, 2018.
Examination Decision of Request for Invalidation, Examination Decision of Request for Invalidation, *Shenzhen Autel Aerial Technology Co., Ltd., v. SZ DJI Technology Co., Ltd.*, Case No. 5W113683, Patent Reexamination Board, State Intellectual Property Office of the Peoples Republic of China, Jun. 5, 2018., 26 pages (including translation).
Notification of Acceptance of the Request for Invalidation, Notification of Acceptance of the Request for Invalidation, *Shenzhen Autel Aerial Technology Co., Ltd., v. SZ DJI Technology Co., Ltd.*, Case No. 5W113683, Patent Reexamination Board, State Intellectual Property Office of China, Dec. 1, 2017., 64 pages (including translation).
Decision of Rejection, JP2017150136, Jul. 7, 2018, 2 pages.
SKYRC Power Switch.
European Search Report and Written Opinion, EP14867034, dated May 4, 2016.
International Search Report, PCT/CN2014/071940, dated Sep. 4, 2014.
International Written Opinion, PCT/CN2014/071940, dated Sep. 4, 2014.
Notice of Allowance for U.S. Appl. No. 14/262,478, dated Jan. 17, 2017.
Office Action for U.S. Appl. No. 14/262,478, dated Apr. 14, 2015.
Office Action for U.S. Appl. No. 14/262,478, dated May 26, 2016.
Office Action for U.S. Appl. No. 14/262,478, dated Oct. 9, 2015.
Office Action for U.S. Appl. No. 14/262,478, dated Nov. 20, 2014.
Viollet, et al., "A 1-gram dual sensorless speed governor for micro-air vehicles," Control and Automation, 2008 16th Mediterranean Conference, pp. 1270, 1275, 10.1109/MED.2008.4602072, Jun. 25-27, 2008.
Exhibit 1027, "Phantom 2 Vision User Manual v.1.2," Jun. 26, 2014., *SZ DJI Technology Co., Ltd., v. Autel Robotics USA LLC* Petition for Post Grant Review (PGR2019-00014) Patent Trial and Appeal Board, United States Patent and Trademark Office.
Exhibit 1028, "Phantom 2 Vision download page," Jun. 26, 2014., http://www.dji.com/product/phantom-2-vision-plus/download, *SZ DJI Technology Co., Ltd., v. Autel Robotics USA LLC* Petition for Post Grant Review (PGR2019-00014) Patent Trial and Appeal Board, United States Patent and Trademark Office.
European Patent Office, "European Search Report," EP18206775.1, dated Feb. 12, 2019., 8 pages.
Invalidation Decision, *SZ Agatech Co., Ltd., v. SZ DJI Technology Co., Ltd.*, Case No. 5W109399 (App.No. 201320802925.9), Patent Reexamination Board, State Intellectual Property Office of the People's Republic of China, Jul. 5, 2016, 25 pages (incl. translation).
Baidu Baike, "Solid State Relay" http://baike.baidu.com/link?url=rAkZZycltgD1DJNns-m4cNZeyUfaPnMcX3hkruZVID.
Baidu Zhidao, "Use of Main Relay of Vehicles" http://zhidao.baidu.com.com/link?url=7RXbilBxuddSLr8XGWgcwMKYfQhUWUNoYhJZBDZ638I_5jHsf1H1CL8b4ma1NYek8YkWyV34kpshVBC61nqurnMoJDu2idyvzsSpuYOTwe_.
Exhibit 1002, U.S. Pat. No. 9,979,000 Prosecution History, *SZ DJI Technology Co., Ltd., v. Autel Robotics USA LLC* Petition for Post Grant Review (PGR2019-00014) Patent Trial and Appeal Board, USPTO.
Exhibit 1007, U.S. Appl. No. 62/187,205, Saika, et al. *SZ DJI Technology Co., Ltd., v. Autel Robotics USA LLC* Petition for Post Grant Review (PGR2019-00014) Patent Trial and Appeal Board, USPTO.
Exhibit 1018, "Websters Encyclopedia Unabridge Dictionary Excerpt" *SZ DJI Technology Co., Ltd., v. Autel Robotics USA LLC* Petition for Post Grant Review (PGR2019-00014) Patent Trial and Appeal Board, USPTO.
Exhibit 1021, "DJI.com", Apr. 13, 2014, *SZ DJI Technology Co., Ltd., v. Autel Robotics USA LLC* Petition for Post Grant Review (PGR2019-00014) Patent Trial and Appeal Board, USPTO.
Exhibit 1022, "Phantom 2 Vision page", Apr. 10, 2014, http://www.dji.com/product/phantom-2-vision-plus/ *SZ DJI Technology Co.,*

(56) References Cited

OTHER PUBLICATIONS

*Ltd.*, v. *Autel Robotics USA LLC* Petition for Post Grant Review (PGR2019-00014) Patent Trial and Appeal Board, USPTO.

Exhibit 1023, "Phantom 2 Vision download page", Apr. 10, 2014, http://www.dji.com/phantom-2-vision-plus/download *SZ DJI Technology Co., Ltd.*, v. *Autel Robotics USA LLC* Petition for Post Grant Review (PGR2019-00014) Patent Trial and Appeal Board, USPTO.

Exhibit 1025, "Phantom 2 Vision User Manual v.1.1.1," Apr. 7, 2014, *SZ DJI Technology Co., Ltd.*, v. *Autel Robotics USA LLC* Petition for Post Grant Review (PGR2019-00014) Patent Trial and Appeal Board, USPTO.

Exhibit 1026, "Phantom 2 Vision press release", Apr. 7, 2014, *SZ DJI Technology Co., Ltd.*, v. *Autel Robotics USA LLC* Petition for Post Grant Review (PGR2019-00014) Patent Trial and Appeal Board, USPTO.

Exhibit 1029, "Phantom 2 Vision User Manual(EN) v.1.4", Aug. 15, 2014, *SZ DJI Technology Co., Ltd.*, v. *Autel Robotics USA LLC* Petition for Post Grant Review (PGR2019-00014) Patent Trial and Appeal Board, USPTO.

Exhibit 1030, "Phantom 2 Vision download page", Oct. 14, 2014, http://www.dji.com/product/phantom-2-vision-plus/download, *SZ DJI Technology Co., Ltd.*, v. *Autel Robotics USA LLC* Petition for Post Grant Review (PGR2019-00014) Patent Trial and Appeal Board, USPTO.

Exhibit 1032, "Phantom 2 firmware press release", Oct. 27, 2014, *SZ DJI Technology Co., Ltd.*, v. *Autel Robotics USA LLC* Petition for Post Grant Review (PGR2019-00014) Patent Trial and Appeal Board, USPTO.

Exhibit 1033, "Phantom 2 Vision User Manual v.1.6", Nov. 12, 2014, *SZ DJI Technology Co., Ltd.*, v. *Autel Robotics USA LLC* Petition for Post Grant Review (PGR2019-00014) Patent Trial and Appeal Board, USPTO.

Exhibit 1034, "Phantom 2 Vision download page", Nov. 14, 2014, http://www.dji.com/product/phantom-2-vision-plus/download, *SZ DJI Technology Co., Ltd.*, v. *Autel Robotics USA LLC* Petition for Post Grant Review (PGR2019-00014) Patent Trial and Appeal Board, USPTO.

Exhibit 1035, "Phantom 2 Vision download page", Dec. 29, 2014, http://www.dji.com/product/phantom-2-vision-plus/download, *SZ DJI Technology Co., Ltd.*, v. *Autel Robotics USA LLC* Petition for Post Grant Review (PGR2019-00014) Patent Trial and Appeal Board, USPTO.

Exhibit 1036, "Phantom 2 Vision download page", Jan. 20, 2015, http://www.dji.com/product/phantom-2-vision-plus/download, *SZ DJI Technology Co., Ltd.*, v. *Autel Robotics USA LLC* Petition for Post Grant Review (PGR2019-00014) Patent Trial and Appeal Board, USPTO.

Exhibit 1037, "Phantom 2 Vision User Manual v.1.8", Jan. 30, 2015, *SZ DJI Technology Co., Ltd.*, v. *Autel Robotics USA LLC* Petition for Post Grant Review (PGR2019-00014) Patent Trial and Appeal Board, USPTO.

Exhibit 1038, "Phantom 2 Vision download page", Feb. 7, 2015, http://www.dji.com/product/phantom-2-vision-plus/download, *SZ DJI Technology Co., Ltd.*, v. *Autel Robotics USA LLC* Petition for Post Grant Review (PGR2019-00014) Patent Trial and Appeal Board, USPTO.

Exhibit 1039, "Phantom 2 Vision download page", Mar. 10, 2015, http://www.dji.com/product/phantom-2-vision-plus/download, *SZ DJI Technology Co., Ltd.*, v. *Autel Robotics USA LLC* Petition for Post Grant Review (PGR2019-00014) Patent Trial and Appeal Board, USPTO.

Exhibit 1040, "Phantom 2 Vision download page", Sep. 7, 2015, http://www.dji.com/product/phantom-2-vision-plus/download, *SZ DJI Technology Co., Ltd.*, v. *Autel Robotics USA LLC* Petition for Post Grant Review (PGR2019-00014) Patent Trial and Appeal Board, USPTO.

Exhibit 1042, "Phantom 2 firmware press release", Mar. 3, 2015, *SZ DJI Technology Co., Ltd.*, v. *Autel Robotics USA LLC* Petition for Post Grant Review (PGR2019-00014) Patent Trial and Appeal Board, USPTO.

Exhibit 1043, "DJI Phantom 2 Vision Review Buttery Smooth Quadcopter Video", Apr. 10, 2014, http://gizmodo.com/dji-phantom-2-vision-review-buttery-smooothquadcopter-1559567158 *SZ DJI Technology Co., Ltd.*, v. *Autel Robotics USA LLC* Petition for Post Grant Review (PGR2019-00014) Patent Trial and Appeal Board, USPTO.

Exhibit 1041, "Phantom 2 Vision download page", Nov. 19, 2015, http://www.dji.com/product/phantom-2-vision-plus/download, *SZ DJI Technology Co., Ltd.*, v. *Autel Robotics USA LLC* Petition for Post Grant Review (PGR2019-00014) Patent Trial and Appeal Board, USPTO.

Exhibit 1044, "DJI Phantom 2 Vision Plus Review, Quadcopter HQ" Apr. 14, 2014, *SZ DJI Technology Co., Ltd.*, v. *Autel Robotics USA LLC* Petition for Post Grant Review (PGR2019-00014) Patent Trial and Appeal Board, USPTO.

Exhibit 1045, "DJI Phantom 2 Vision review Top-notch eye in the sky, CNET", Oct. 14, 2014, *SZ DJI Technology Co., Ltd.*, v. *Autel Robotics USA LLC* Petition for Post Grant Review (PGR2019-00014) Patent Trial and Appeal Board, USPTO.

Exhibit 1046, "DJI Phantom 2 Vision First look and Review , DroneFlyers", Jul. 4, 2014, *SZ DJI Technology Co., Ltd.*, v. *Autel Robotics USA LLC* Petition for Post Grant Review (PGR2019-00014) Patent Trial and Appeal Board, USPTO.

Exhibit 1047, "Phantom 2 Vision Initial Unboxing, RC Geeks Blog" www.rcgeeks.co.uk/blog/phantom-2-vision-plus-initial-unboxing *SZ DJI Technology Co., Ltd.*, v. *Autel Robotics USA LLC* Petition for Post Grant Review (PGR2019-00014) Patent Trial and Appeal Board, USPTO.

Exhibit 1002, U.S. Pat. No. 10,044,013 Prosecution History, *SZ DJI Technology Co., Ltd.*, v. *Autel Robotics USA LLC* Petition for Post Grant Review (PGR2019-00014) Patent Trial and Appeal Board, USPTO.

Exhibit 1031, "Phantom 2 Vision download page", Oct. 20, 2014, *SZ DJI Technology Co., Ltd.*, v. *Autel Robotics USA LLC* Petition for Post Grant Review (PGR2019-00014) Patent Trial and Appeal Board, USPTO.

\* cited by examiner

BATTERY AND UNMANNED AERIAL VEHICLE WITH THE BATTERY

CROSS-REFERENCE

This application is a continuation of U.S. application Ser. No. 15/417,168, filed on Jan. 26, 2017, which is a continuation application of U.S. application Ser. No. 14/262,478, filed on Apr. 25, 2014, now U.S. Pat. No. 9,592,744, issued Mar. 14, 2017, which is a continuation application of International Application No. PCT/CN2014/071040, filed on Feb. 10, 2014, which claims priority from Chinese Patent Application No. 201310659214.5, filed on Dec. 6, 2013, all of which are incorporated herein by reference in their entireties.

BACKGROUND

Unmanned vehicles such as unmanned aerial vehicles (UAVs) can be used for performing surveillance, reconnaissance, and exploration tasks for military and civilian applications. Such unmanned vehicles typically include a propulsion system for remote controlled and/or autonomous movement with the surrounding environment. For example, the unmanned vehicles may have a power supply that powers a device of the unmanned vehicle, such as the propulsion system.

Existing systems of battery or power output control for unmanned vehicles, however, can be less than ideal. The batteries traditionally used in UAVs, for example, can have very large currents and can lack a discharge control mechanism. The batteries traditionally also lack an indicator for a power supply level.

SUMMARY

A need exists for a power supply, such as batteries, having an improved discharge control mechanism. Previously described batteries can use an electromechanical switch for discharge control of the battery, or discharge can be controlled by an interface between the battery and the electrical equipment. However, during the process of connecting the interface between the two devices or when the electromechanical switch is closed, sparks can be produced at the contact point.

The sparks can have at least two harmful effects. First, the sparks can bring an instantly high voltage, often 2-3 times higher than the battery voltage. This high voltage can damage electrical equipment. Second, the sparks can burn and erode the contact point, resulting in increased resistance or a bad connection at the contact point, which can be a safety risk (e.g., for movable objects, such as unmanned aerial vehicles (UAVs)). Furthermore, due to large current and a lack of charge/discharge protection, the batteries are often damaged due to over-charge and/or over-discharge. There is also a possibility of battery explosion or bulging due to over-charge. Also, the user is forced to rely on the measurement of voltage to determine the remaining battery power, which can be very inaccurate. Battery depletion can be dangerous (e.g., during flight of a UAV).

For these reasons, the disclosure provides a power supply with a multifunction protection board which can provide charge and discharge protection as well as power supply capacity calculation. Further, power that is provided externally can be controlled by controlling the electronic power components.

An aspect of the invention is directed to a power supply control assembly, comprising: a power supply adapted to power an unmanned aerial vehicle (UAV); and a power supply circuit connected to the power supply, wherein the power supply discharges through the power supply circuit to power a device to be powered, wherein the power supply circuit comprises an electronic switch and an input device, the electronic switch being electrically connected to the power supply for controlling a power-on or a power-off of the power supply, the input device electrically connected to the electronic switch for controlling a switch-on or a switch-off state of the electronic switch. In some embodiments, the device to be powered includes a propulsion unit of the UAV. The propulsion unit may include one or more rotors with rotatable blades, and wherein the power supply causes rotation of the rotor including the blades, thereby generating a lift for the UAV.

An additional aspect of the invention may be directed to an unmanned aerial vehicle (UAV), comprising: a device to be powered; a power supply for powering the device to be powered; and a power supply circuit connected to the power supply, wherein the power supply discharges through the power supply circuit to power the device to be powered, wherein the power supply circuit comprises an electronic switch and an input device, the electronic switch being electrically connected to the power supply for controlling a power-on or a power-off of the power supply, the input device electrically connected to the electronic switch for controlling a switch-on or a switch-off state of the electronic switch. The device to be powered may include a propulsion unit of the UAV. The propulsion unit may include one or more rotors with rotatable blades, and wherein the power supply causes rotation of the rotor including the blades, thereby generating a lift for the UAV.

In some embodiments, the power supply circuit may further comprise a power measurement device and an indication device, the power measurement device being electrically connected to the power supply and configured to calculate a level of charge of the power supply, and the indication device being electrically connected to the power measurement device and configured to indicate a percentage of the remaining charge of the power supply. The power measurement device may comprise a current sampling device configured to collect current during discharge of the power supply, and wherein the power measurement device is configured to collect the current collected by the current sampling device and calculate the level of charge of the power supply. The level of charge of the power supply may be calculated based on measuring an amount of energy consumed. Alternatively, the level of charge of the power supply is not calculated based on measurement of a voltage drop across the power supply. Optionally, the indication device may comprise a plurality of indicator lights and the number of simultaneously-lit indicator lights may correspond to a percentage of the level of charge of the power supply. Furthermore, an interface may be provided that is configured to provide access to the level of charge of the power supply and voltage of the power supply.

The electronic switch may utilize solid state electronics. In some implementations, the electronic switch does not include any devices with moving parts. The electronic switch may include one of a power MOSFET, a solid state relay, a power transistor, or an insulated gate bipolar transistor (IGBT).

The level of the charge of the power supply may be displayed with one or more LED lights. Activation of a first LED light may indicate that the power supply has between about 0% and about 25% power remaining. Activation of a second LED light may indicate that the power supply has between about 25% and about 50% power remaining. Activation of a third LED light may indicate that the power supply has between about 50% and about 75% power remaining. Activation of a fourth LED light may indicate that the power supply has between about 75% and about 100% power remaining.

The input device may include one of a button switch, a mechanical switch, a potentiometer, or a sensor. In some embodiments, the sensor includes at least a touch sensor, photosensor, or audio sensor.

A power supply housing may be provided in accordance with embodiments of the invention, the power supply housing comprising a bottom member having an opening at a first end and a cover member, the cover member sealing the opening of the bottom member, wherein the power supply is disposed in the bottom member, and wherein the electronic switch, input device, power measurement device and indication device are all disposed on a circuit board. The power supply may include a battery or a battery pack.

In some embodiments, a ratio between a weight of the power supply circuit and the weight of the power supply is less than 1:11. The power supply and power supply circuit combined may weigh less than about 400 grams. The power supply may produce a current of at least about 100 mA. The power supply may produce a current of at most about 40 A. The UAV may be capable of flying for at least about 25 minutes without recharging.

A power supply control assembly may be provided in accordance with another aspect of the invention. The power supply control may comprise: a power supply adapted to power an unmanned aerial vehicle (UAV); and a microcontroller unit (MCU) coupled to the power supply and capable of at least one of (i) controlling discharge of the power supply, (ii) calculating the level of charge of the power supply, (iii) protecting against a short circuit of the power supply, (iv) protecting against over-charge of the power supply, (v) protecting against over-discharge of the power supply, (vi) balancing the level of charge amongst the batteries comprising the power supply, (vii) preventing charging of the power supply at temperatures outside a temperature range, or (viii) communicating information with an external device.

Moreover, an aspect of the invention may be directed to an unmanned aerial vehicle (UAV), comprising: a propulsion unit to be powered; a power supply for powering the propulsion unit; and a microcontroller unit (MCU) capable of at least one of (i) controlling discharge of the power supply, (ii) calculating the level of charge of the power supply, (iii) protecting against a short circuit of the power supply, (iv) protecting against over-charge of the power supply, (v) protecting against over-discharge of the power supply, (vi) balancing the level of charge amongst one or more batteries comprising the power supply, (vii) preventing charging of the power supply at temperatures outside a temperature range, or (viii) communicating with an external device.

The MCU may be capable of at least two of (i)-(viii). The MCU may be capable of at least (i) and (ii). The MCU may be capable of at least (iv) and (v). The MCU may weigh less than about 1 gram.

In some embodiments, communicating with the external device comprises providing state information associated with the power supply to the external device. Communicating with the external device may further comprise receiving information from the external device.

A power supply circuit connected to the power supply may be provided, wherein the power supply discharges through the power supply circuit to power the unmanned aircraft, wherein the power supply circuit comprises an electronic switch and an input device, the electronic switch being electrically connected to the power supply for controlling a power-on or a power-off of the power supply, the input device electrically connected to the electronic switch for controlling a switch-on or a switch-off state of the electronic switch.

The propulsion unit may include one or more rotors with rotatable blades, wherein the power supply causes rotation of the rotor including the blades, thereby generating a lift for the UAV.

In some embodiments, the power supply circuit may further comprise a power measurement device and an indication device, the power measurement device being electrically connected to the power supply and configured to calculate a level of charge of the power supply, and the indication device being electrically connected to the power measurement device and configured to indicate a percentage of the remaining charge of the power supply. The power measurement device may comprise a current sampling device configured to collect current during discharge of the power supply, and wherein the power measurement device is configured to collect the current collected by the current sampling device and calculate the level of charge of the power supply. The level of charge of the power supply may be calculated based on measuring an amount of energy consumed. Alternatively, the level of charge of the power supply is not calculated based on measurement of a voltage drop across the power supply. Optionally, the indication device may comprise a plurality of indicator lights and the number of simultaneously-lit indicator lights may correspond to a percentage of the level of charge of the power supply. Furthermore, an interface may be provided that is configured to provide access to the level of charge of the power supply and voltage of the power supply.

The electronic switch may utilize solid state electronics. In some implementations, the electronic switch does not include any devices with moving parts. The electronic switch may include one of a power MOSFET, a solid state relay, a power transistor, or an insulated gate bipolar transistor (IGBT).

The level of the charge of the power supply may be displayed with one or more LED lights. Activation of a first LED light may indicate that the power supply has between about 0% and about 25% power remaining. Activation of a second LED light may indicate that the power supply has between about 25% and about 50% power remaining. Activation of a third LED light may indicate that the power supply has between about 50% and about 75% power remaining. Activation of a fourth LED light may indicate that the power supply has between about 75% and about 100% power remaining.

The input device may include one of a button switch, a mechanical switch, a potentiometer, or a sensor. In some embodiments, the sensor includes at least a touch sensor, photosensor, or audio sensor.

A power supply housing may be provided in accordance with embodiments of the invention, the power supply housing comprising a bottom member having an opening at a first end and a cover member, the cover member sealing the opening of the bottom member, wherein the power supply is disposed in the bottom member, and wherein the electronic switch, input device, power measurement device and indication device are all disposed on a circuit board. The power supply may include a battery or a battery pack.

In some embodiments, a ratio between a weight of the power supply circuit and the weight of the power supply is less than 1:11. The power supply and power supply circuit combined may weigh less than about 400 grams. The power supply may produce a current of at least about 100 mA. The power supply may produce a current of at most about 40 A. The UAV may be capable of flying for at least about 25 minutes without recharging.

Further aspects of the invention may include a power supply control assembly, comprising: a power supply; and an input device configured to receive a user input to switch between a plurality of operational modes associated with the power supply, said operational modes including at least (i) activating display of a level of charge of the power supply and (ii) turning on or turning off the power supply by turning on or off of an electronic switch in electrical communication with the power supply. The power supply may be adapted to power an unmanned aerial vehicle (UAV).

The plurality of operational modes may further include communicating with an external device. Communicating with the external device may comprise providing state information associated with the power supply to the external device. In some cases, communicating with the external device comprises receiving information from the external device.

An aspect of the invention may include method for managing a power supply in accordance with another aspect of the invention, The method may comprise: receiving an input signal provided by a user of the power supply; and in response to the input signal, selecting an operational mode from a plurality of operational modes associated with the power supply based at least in part one or more characteristics associated with the input signal, the plurality of operation modes including at least (i) activating display of a level of charge of the power supply and (ii) turning on or turning off the power supply by turning on or off of an electronic switch in electrical communication with the power supply.

The power supply may be powered on or off without generating a spark. One or more characteristics associated with the input signal may include a length of time of the input signal. Selecting the operational modes may optionally include comparing the input signal with a predetermined signal pattern.

In some embodiments, a power supply circuit may be connected to the power supply, wherein the power supply discharges through the power supply circuit to power the unmanned aircraft, wherein the power supply circuit comprises an electronic switch, the electronic switch being electrically connected to the power supply for controlling a power-on or a power-off of the power supply.

In some embodiments, the power supply circuit may further comprise a power measurement device and an indication device, the power measurement device being electrically connected to the power supply and configured to calculate a level of charge of the power supply, and the indication device being electrically connected to the power measurement device and configured to indicate a percentage of the remaining charge of the power supply. The power measurement device may comprise a current sampling device configured to collect current during discharge of the power supply, and wherein the power measurement device is configured to collect the current collected by the current sampling device and calculate the level of charge of the power supply. The level of charge of the power supply may be calculated based on measuring an amount of energy consumed. Alternatively, the level of charge of the power supply is not calculated based on measurement of a voltage drop across the power supply. Optionally, the indication device may comprise a plurality of indicator lights and the number of simultaneously-lit indicator lights may correspond to a percentage of the level of charge of the power supply. Furthermore, an interface may be provided that is configured to provide access to the level of charge of the power supply and voltage of the power supply.

The electronic switch may utilize solid state electronics. In some implementations, the electronic switch does not include any devices with moving parts. The electronic switch may include one of a power MOSFET, a solid state relay, a power transistor, or an insulated gate bipolar transistor (IGBT).

The level of the charge of the power supply may be displayed with one or more LED lights. Activation of a first LED light may indicate that the power supply has between about 0% and about 25% power remaining. Activation of a second LED light may indicate that the power supply has between about 25% and about 50% power remaining. Activation of a third LED light may indicate that the power supply has between about 50% and about 75% power remaining. Activation of a fourth LED light may indicate that the power supply has between about 75% and about 100% power remaining.

The input device may include one of a button switch, a mechanical switch, a potentiometer, or a sensor. In some embodiments, the sensor includes at least a touch sensor, photosensor, or audio sensor.

A power supply housing may be provided in accordance with embodiments of the invention, the power supply housing comprising a bottom member having an opening at a first end and a cover member, the cover member sealing the opening of the bottom member, wherein the power supply is disposed in the bottom member, and wherein the electronic switch, input device, power measurement device and indication device are all disposed on a circuit board. The power supply may include a battery or a battery pack.

In some embodiments, a ratio between a weight of the power supply circuit and the weight of the power supply is less than 1:11. The power supply and power supply circuit combined may weigh less than about 400 grams. The power supply may produce a current of at least about 100 mA. The power supply may produce a current of at most about 40 A. The UAV may be capable of flying for at least about 25 minutes without recharging.

It shall be understood that different aspects of the invention can be appreciated individually, collectively, or in combination with each other. Various aspects of the invention described herein may be applied to any of the particular applications set forth below or for any other types of movable objects. Any description herein of an aerial vehicle or UAV may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present invention will become apparent by a review of the specification, claims, and appended figures.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
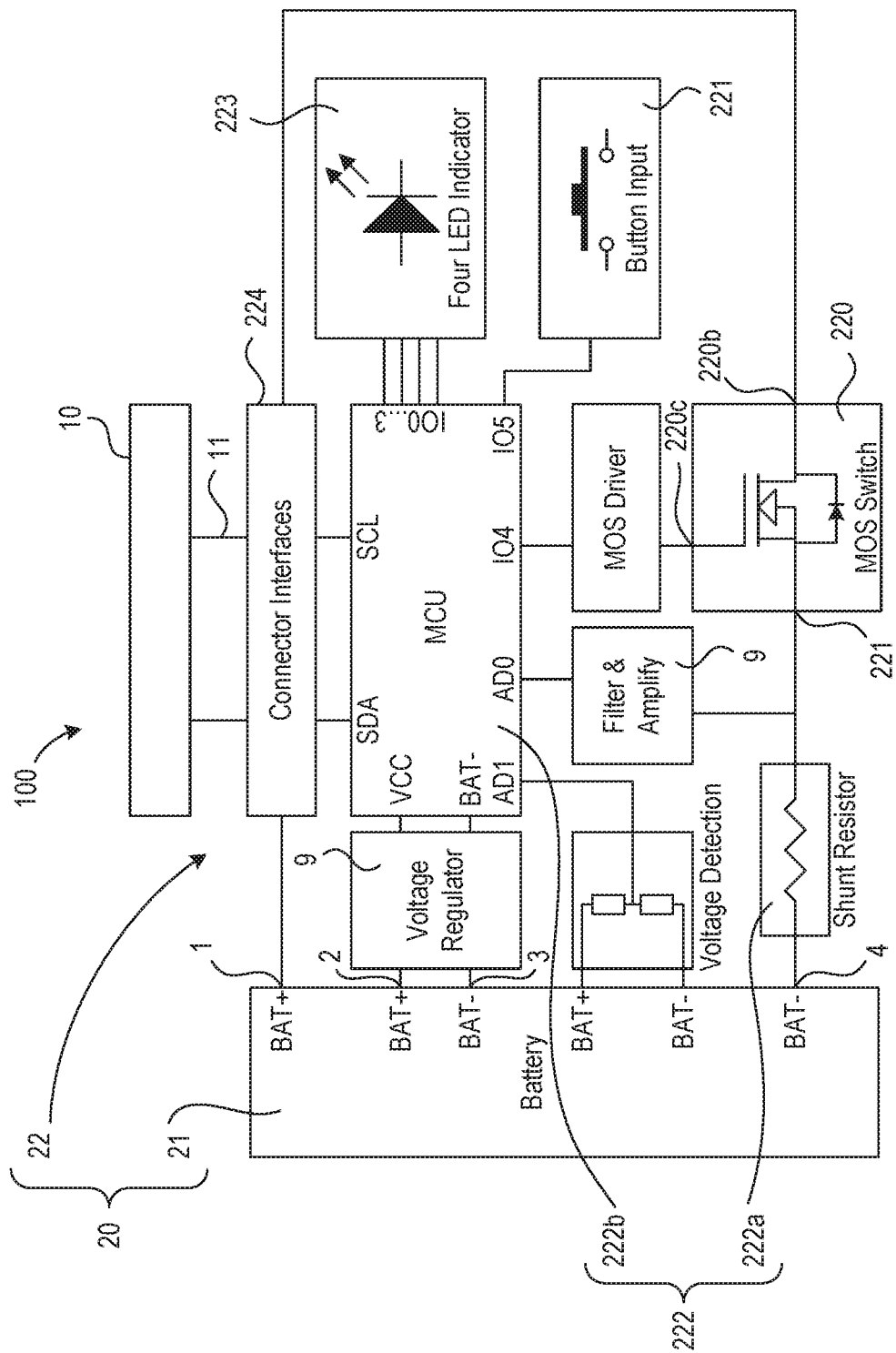
FIG. 1 is a schematic circuit diagram of a vehicle of the disclosure.

The systems, methods, and devices of the present invention provide a power supply with a power supply control assembly and a device with the power supply. In some cases, the device is a movable object, such as an unmanned aerial vehicle (UAV). The power supply may be or may include a battery or battery pack. A power supply control assembly may include a power supply circuit. The power supply control may overcome challenges related to lack of discharge control. The power supply circuit can be connected to the power supply. The power supply can discharge through the power supply circuit. The power supply circuit can comprise an electronic switch and an input device, with the electronic switch being electrically connected to the power source for controlling power on or off of the power supply. The input device can be electrically connected to the electronic switch for controlling the switched-on or switched-off state of the electronic switch. Use of the electronic switch which may utilize solid state electronics can prevent sparking from occurring during charge or discharge of the power supply. For example, the electronic switch includes one of a power MOSFET, a solid state relay, a power transistor, or an insulated gate bipolar transistor (IGBT). The input device which may communicate with the electronic switch. The input device may include one or more of a button switch, mechanical switch, potentiometer, or sensor.

In accordance with an aspect of the invention, the power supply control assembly can prevent the formation of a spark upon power-on or power-off of the device. In the case of UAVs, the current can be relatively high. The current from the power supply can be greater than or equal to about 10 mA, 50 mA, 75 mA, 100 mA, 150 mA, 200 mA, 300 mA, 500 mA, 750 mA, 1 A, 2 A, 5 A, 10 A, 15 A, 20 A, 30 A, or 40 A. The maximum current supplied from the power supply may be less than or equal to about 100 mA, 150 mA, 200 mA, 300 mA, 500 mA, 750 mA, 1 A, 2 A, 5 A, 10 A, 15 A, 20 A, 30 A, 40 A, 50 A, 60 Am, 70 A, or 100 A. The power supply may be capable of supplying current having a maximum or minimum value having any of the values described herein, or falling within a range defined by any of the values described herein. The current from the power supply used to power a movable object, such as a UAV, may be greater than or equal to a current used to power another electronic device, such as a personal computer or laptop.

The power supply control assembly can have a number of useful features, or can interact with or be part of a UAV having a number of useful features. In some embodiments, connectors can make plugging the power supply into another power source easy. For example, a power supply may be connected to an external power supply that may charge the battery. In some cases, a power supply level checker is integrated in the device. The power supply level checker can display the power supply charge level whenever the user desires, without the need of a multimeter or separate power supply level detector device. For example a visual indicator may be provided that shows the power supply level upon request or continuously. The power supply can also be safer than previous designs due to short protection and protection against high current levels, which can be both integrated into the power supply control assembly.

In some embodiments, the power supply control assembly can achieve more precise estimation of the amount of remaining power in the power supply than previous designs. Previous designs often estimate the battery level by simply measuring the voltage. However, when a device to be powered is in operation, such when a UAV is flying, there can be a large voltage drop when the motors are spinning and the measurement based on voltage can be inaccurate. In contrast, the power supply system disclosed herein may determine the remaining battery power by monitoring the total energy that is consumed, which results in a more precise battery level indication.

In some cases, the present power supply control assembly may be easier to recharge than previous designs. Optionally, all of the balancing circuits and protection circuits are integrated inside the power supply control assembly. The power supply control assembly, including the balancing circuits and protection circuits, may be packaged with a power supply, such as a battery. For example, a housing may partially or completely enclose the power supply and power supply control assembly. So all a user needs to do is to connect the charger to the power supply package which may include the power supply and power supply control assembly. There is no need to be concerned with how many cells the power supply has in serial and in parallel.

In some instances, the power supply has improved durability. The power supply described herein can have a frame to protect one or more battery cells therein, such that the power supply can be dropped without harming the battery cells.

Optionally, the power supply described herein does not deplete its charge when left un-plugged. A low voltage protection circuit inside the power supply package turns the power supply and/or device off once the charge is lower than a certain threshold.

A UAV powered by the power supply and power supply control assembly may be able to fly for a long period of time and/or is able to fly a long distance. In some cases, the UAV can fly for at least 5, at least 10, at least 15, at least 20, at least 25, at least 30, at least 35, at least 45, at least 60, at least 90, at least 120, at least 150, or at least 180 minutes. Such times the UAV may be capable of flying may include a period of time of continuous flight after the power supply has been fully charged. In some cases, the UAV can fly a distance of at least 0.5, at least 1, at least 2, at least 3, at least 4, at least 5, at least 6, at least 7, at least 8, at least 9, at least 10, at least 12, at least 14, at least 16, at least 18, at least 20, or at least 30 miles. Such distances the UAV may be capable of flying may include a distance of continuous flight after the power supply has been fully charged.

In some cases, the power supply circuit further comprises a power measurement device and indication device. The power measurement device can be electrically connected to the power source and configured to calculate the remaining capacity of the power supply. The indication device can be electrically connected to the power measurement device and configured to indicate a percentage of the remaining capacity of the power supply.

The power measurement device may comprise a current sampling device. The current sampling device can be configured to collect current during discharge of the power supply. The power measurement device can be configured to collect the current collected by the current sampling device and perform calculations of the current collected by the current sampling device to obtain the remaining capacity of the power supply.

The indication device may comprise a plurality of indicator lights. The power measurement device can be configured to divide the remaining capacity of the power supply by the total capacity of the power supply to obtain a percentage of the remaining capacity. In some embodiments, the number of simultaneously lit indicator lights corresponds to the percentage of the remaining capacity of the power supply. Unlit indicator lights may correspond to a percentage capacity of the power supply that has been used or discharged.

A power supply pack may include an interface configured to provide access to the remaining capacity information and voltage information of the power supply.

A control device may be provided as part of a power control system, where the control device is electrically connected to the power supply, electronic switch, input device and indication device.

The power supply pack may comprise a housing. The housing can comprise a bottom member having an opening at one end and a cover member, the cover member sealing the opening of the bottom member, the power supply disposed in the bottom member, the electronic switch, the input device, the power measurement device and the indication device all disposed on a circuit board.

Aspects of the invention may include a movable object, such as an aircraft (e.g., UAV), comprising equipment to-be-powered (e.g., aircraft) and a battery, wherein the to-be-powered equipment is electrically connected to the battery.

The power supply system as described herein can use electronic switches to control the power, thereby avoiding the generation of sparks during power-on, allowing for the normal use of the power supply and safety of the aircraft.

With reference to FIG. 1, an object to be powered, such as a movable object 100 (e.g., vehicle such as a UAV) may be provided in accordance with an embodiment of the invention. Examples of a power supply pack of the disclosure are depicted in FIG. 2, FIG. 3, FIG. 4 and FIG. 5.

The movable objects and power supply packs of the disclosure can have power supply power indication and discharge control. FIG. 1 is a block diagram of the movable object and a power supply pack having various parts described in detail below, including a battery or battery pack 21, a current sampling resistor 222a, a power MOSFET electronic switch 220, a button 221, four LED power indicator lights 223, an microcontroller unit (MCU) 222b, and a battery external interface 10.

A power supply may be provided to power the movable object or a portion of the movable object. The power supply may power one or more propulsion units of the movable object. For example, the power supply may power one or more rotors of a UAV that may provide lift to the UAV and enable it to fly. The power supply may power one or more communication system (e.g., communication system with a remote control) of the movable object. The power supply may power a carrier that may be part of the movable object or coupled to the movable object. The power supply may include a battery or battery pack. The battery or battery pack may include one or more battery cells. The battery cells may be electrochemical cells. The batteries may preferably be secondary (rechargeable) batteries. Alternatively, they may be primary (single-use) batteries. Batteries having any battery chemistry known or later developed in the art may be used. In some instances, batteries may be lead acid batteries, valve regulated lead acid batteries (e.g., gel batteries, absorbed glass mat batteries), nickel-cadmium (NiCd) batteries, nickel-zinc (NiZn) batteries, nickel metal hydride (NiMH) batteries, or lithium-ion (Li-ion) batteries. The battery cells may be connected in series, in parallel, or any combination thereof. The battery cells may be packaged together as a single unit or multiple units.

In some embodiments, a MOSFET power element 220 is used as a device for controlling the output of the battery 21. In alternative embodiments, any electronic switch may be provided for controlling output of the battery. An electronic switch may utilize solid state electronics to control charge and discharge of the battery. In some instances, an electronic switch has no moving parts and/or does not utilize an electro-mechanical device (e.g., traditional relays or switches with moving parts). In some instances, electrons or other charge carriers of the electronic switch are confined to a solid device. The electronic switch may optionally have a binary state (e.g., switched-on or switched off). The use of an electronic switch may help prevent sparking which can cause damage to the power supply pack and/or movable object. The electronic switch may be used to control charge and/or discharge of the battery or battery pack.

The button 221 may be used to control a state of the electronic switch. Any type of input device may be used in place of a button. The input device may be button switch, mechanical switch, potentiometer, or sensor. The input device may have a binary state (e.g., on or off), or may have three or more states. The input device may accept an input directly from a user. For example, a user may manually interact with the input device (e.g., pressing a button, flipping a switch, turning a knob or dial, touching a touch interface such as a touchscreen, speaking to a microphone). Alternatively, the input device may receive a signal indicative of a user input. For example, a user may interact with a remote control that may relay a signal (e.g., wired or wireless signal) to the input device, which may in turn control a state of the electronic switch. For example, the input device may be in communication with the electronic switch to control a switched-on or switched-off state of the electronic switch. In some instances, an input device may function as an interface between a user input and control of the electronic switch which may selectively cause discharge of the power supply.

An MCU 222b can be the control unit for achieving the overall functionality. It can connect to the input device, e.g., button input 221, to determine if the user intends to turn on or off the electronic switch, e.g., MOSFET 220. The on or off of the MOSFET 220 can be controlled by the signals from the MCU 222b. In some embodiments, the MCU may receive an input from the input device, and may use the input from the input device to generate a signal to control the state of the electronic switch.

In the negative discharge circuit, there can be a current sampling resistor 222a (e.g., about 0.01 ohm) to capture the current during the charge and discharge process. The MCU 222b can capture the current signal at a high frequency and use an integration process to calculate the power supply capacity. When the battery current sampling frequency is low, the accuracy of the calculated battery capacity may be reduced. When the battery current sampling frequency is high, the accuracy of the calculated battery capacity may be increased. In some implementations, the battery current sampling frequency may be about 0.3 Hz-100 kHz. For example, the battery current sampling frequency may be greater than or equal to about 0.3 Hz, 0.5 Hz, 1 Hz, 2 Hz, 3 Hz, 5 Hz, 7 Hz, 10 Hz, 15 Hz, 20 Hz, 25 Hz, 30 Hz, 40 Hz, 50 Hz, 75 Hz, 100 Hz, 200 Hz, 500 Hz, 1 kHz, 2 kHz, 3 kHz, 5 kHz, 10 kHz, 20 kHz, 50 kHz, 75 kHz, or 100 kHz. The battery current sampling frequency may be less than or equal to about 10 Hz, 15 Hz, 20 Hz, 25 Hz, 30 Hz, 40 Hz, 50 Hz, 75 Hz, 100 Hz, 200 Hz, 500 Hz, 1 kHz, 2 kHz, 3 kHz, 5 kHz, 10 kHz, 20 kHz, 50 kHz, 75 kHz, 100 kHz, or 200 kHz.

In some embodiments, a level of a power supply may be determined as a percentage of the power supply capacity. The percentage of the power supply capacity can be calculated by dividing the capacity of the power capacity that remains by the total power supply capacity. In other embodiments, the power supply capacity may be expressed in other terms, such as continuous-time-of use remaining (e.g., the length of time the power supply can continue discharging at its discharge rate). The discharge rate may be the current rate of discharge, a previous rate of discharge, an average rate of discharge over a period of time, or any other rate of discharge.

A power level indication device may be provided. For example, a plurality of indicator lights may be provided, where the number of lit lights may correspond to a percentage of the power supply capacity that remains. The number of unlit lights may correspond to a percentage of the power supply capacity that has been used or discharged. Any number of indicator lights may be provided, which may determine the precision of the percentage ranges that can be established. For example, the use of four power indicator lights may provide indication of the remaining power level within the 25% range. The use of 5 power indicator lights may provide indication of the remaining power level within the 20% range. The use of N power indicator lights may provide indication of the remaining power level within the 100/N percent range. In some embodiments, four LED power indicator lights 223 indicate the approximate percentage of battery power. For example, four lit lights can represent that the battery has 75-100% power remaining, three lit lights can represent 50-75% of the battery power, two lit lights can represent 25-50% of the battery power, and one lit light can represent 0-25% of capacity. As such, the user can approximate the battery capacity at the present moment in time. In other embodiments, other types of power level indicators may be provided. For example, an output may be provided showing a numerical value indicative of the power level. For example, the power level indication device may say 83%, when 83% of the power level remains, or may provide a range (e.g., 80-90%, when 83% of the power level remains). Other graphical indicators, such as colors, bars, levels, line graphs, icons may be used to provide a visual indication of the power level.

Positioning the battery indicator LED lights through a light guide member passing to the outside of the battery can result in user-friendly operation. The battery indicator LED lights can be numbered in order. Light can be provided outside the battery via a light guide member to facilitate user observation.

The power level may be displayed continuously, so the user may be able to view the power level at any moment in time. Alternatively, the user may be able to view the power level in response to a signal to show the power level (e.g., the user presses a button that causes the power level to light up, the user provides a voice command that causes the power level to be displayed, a motion sensor detects the presence of a user and causes the power level to be displayed). The power level may be displayed on an external surface of a power supply pack, or an object to be powered by the power supply pack. For example, a user may be able to view an external portion of a UAV and see the power level remaining for the power supply for the UAV. The user may be able to view the power level without requiring the use of any other external device. The user may be able to view the power level without taking apart any portion of the UAV. The power level indicator may be self contained within a power supply pack. The power level may be displayed on the power supply pack when the power supply pack is connected or installed on the UAV. In some embodiments, the power level may be displayed on the power supply pack even when the power supply pack is not connected to or installed on the UAV.

The device can also be equipped with a data communication interface. Other electronic devices can obtain, through the interface, the current battery capacity information, voltage information and other information. Such information can be used to provide battery protection functionalities.

As shown, the circuits for discharge control and power display can be formed into a circuit board. The circuit board can include all of the functionalities associated with discharge control and power calculation and display. For example, an MCU may be provided on or supported by the circuit board. The power supply and the circuit board can be placed inside the same housing and the input device can be connected to the power supply pack surface (e.g., battery or battery cell surface), e.g., as a button, to allow user operation.

Figure 2:
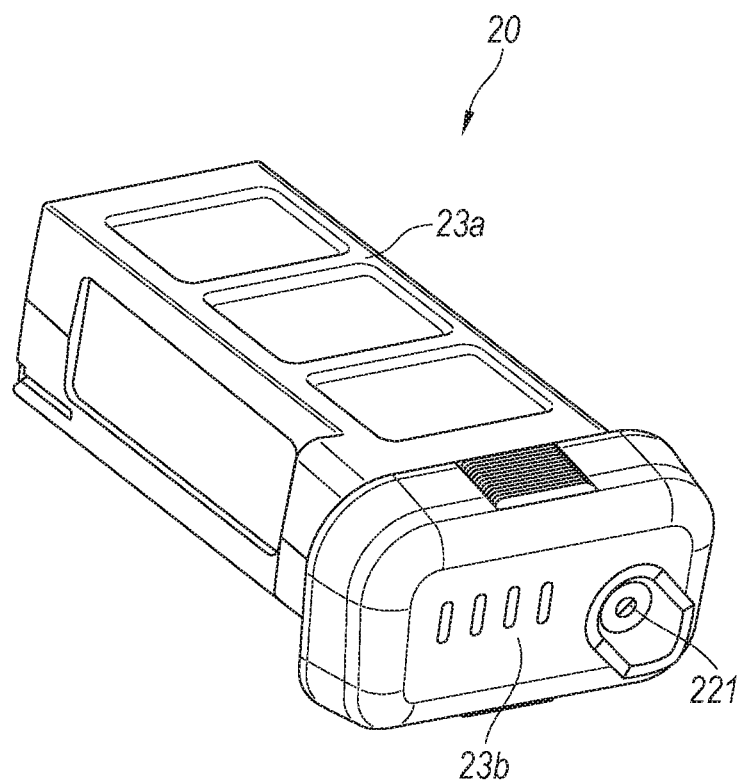
FIG. 2 is a schematic diagram of a vehicle battery of the disclosure.
Figure 3:
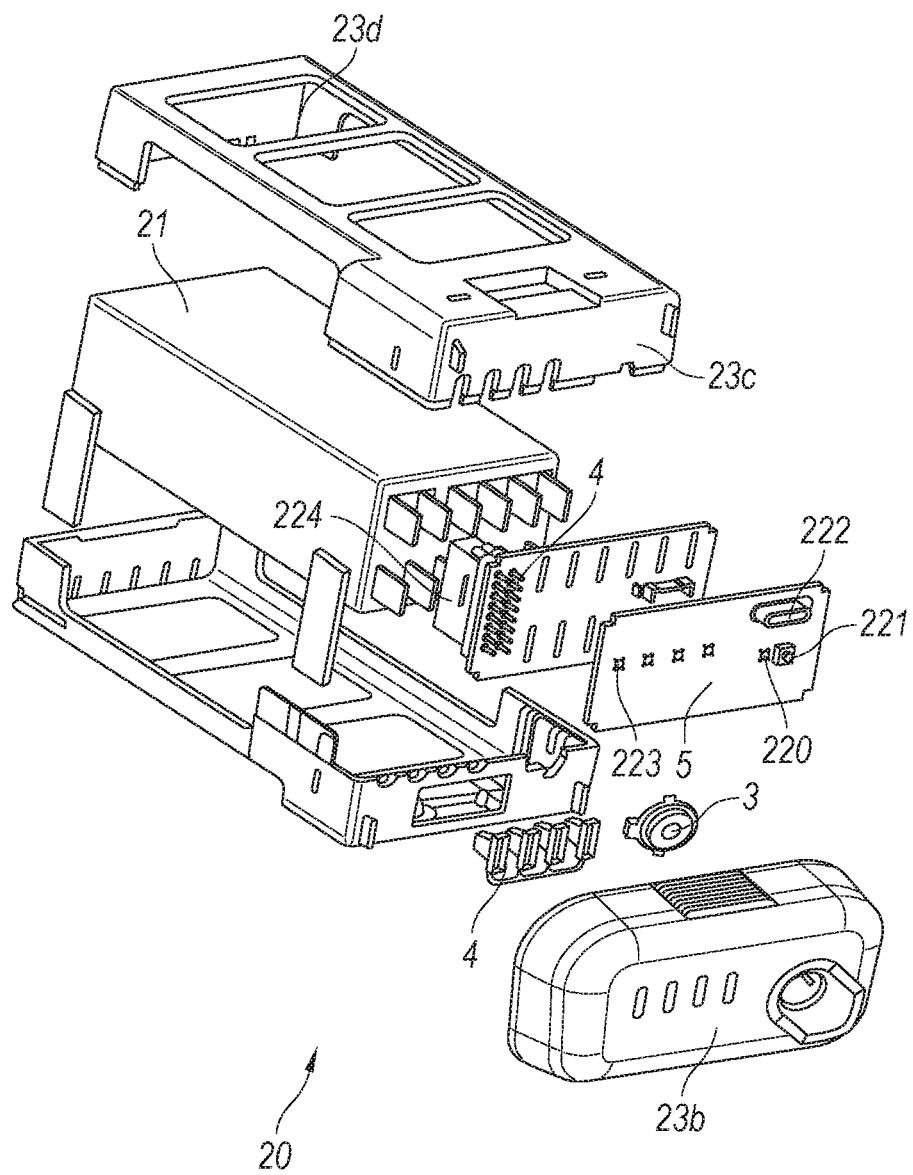
FIG. 3 is an exploded schematic view of the battery of FIG. 1.

With reference to FIG. 1, FIG. 2, FIG. 3, the movable object 100 includes a device 10 to be powered and a power supply pack 20. The device to be powered 10 and the power supply pack 20 can be electrically connected. In some embodiments, the device 10 to be powered may include an input interface 11. The power supply pack 20 may be electrically connected to the input interface 11 to supply power to the device 10. In this embodiment, the movable object 100 may be an aircraft, such as a UAV.

The power supply pack 20 may include a power supply 21, a power supply circuit 22 and a housing 23. The power supply circuit 22 may be electrically connected to the power supply 21. In some embodiments, the power supply circuit may be mechanically connected to the power supply as well. The power supply 21 discharges via the power supply circuit 22. The power supply circuit 22 may comprise an electronic switch 220, an input device 221, a battery testing device 222, an indication device 223, an interface 224, and a control device 225.

The power supply 21 can comprise any type of battery, such as lithium battery, or any other type of battery described elsewhere herein. In some cases, the power supply 21 may also be in the form of battery pack or other types of UAV battery. The power supply 21 may include electrodes 1, 2, 3, and 4. In this case, the electrodes 1 and 2 are positive and the electrodes 3 and 4 are negative. The power supply may include one or more positive electrodes and one or more negative electrodes. In some embodiments, the same number of positive and negative electrodes may be provided. One or more of the electrodes may be directly or indirectly electrically connected to an electronic switch, MCU, voltage regulator, voltage detector, or shunt resistor.

The interface 224 can be used to obtain signals of the currently remaining capacity and/or voltage of the power supply. In the present embodiment, the interface 224 is connected in series between the electrode 1 and the electrode 4 of the power source 21. Other electronic devices can obtain, via the interface 224, the current capacity information of the power source 21, voltage information and other information, and can use the data to implement the battery protection.

The connector interface 224 may be in electrical communication with the input interface 11. This may provide electrical connection and/or communication with a device 10 to be powered. In some embodiments, a power supply pack may be a self contained package that may be inserted into (or attached to) a movable object or removed from the movable object. Different power supply packs may be swapped. Inserting the power supply pack into the movable object (or attaching the power supply pack to the movable object) may automatically cause the electrical connections to come into contact with one another so that the power supply can power a device to be powered on the movable object.

The electronic switch 220 can be electrically connected to the power source 21, for controlling on-off of the power source 21. In the present embodiment, the electronic switch 220 can be selected from any of power MOSFET, solid state relays, power transistor and an insulated gate bipolar transistor (IGBT). Specifically, the electronic switch 220 is connected in series between the electrode 4 of the power source 21 and the interface 224. The source 221 of the electronic switch 220 is in series with the electrode 4. The drain 220b of the electronic switch 220 is connected in series with the interface 224. The gate of the electronic switch 220 is controlled by the microcontroller 220c. The input interface 11 of the to-be-powered device 10 is electrically connected to the power supply 21 via the interface 224. In some embodiments, the electronic switch 220 can also use other forms of mechanical relay or non-mechanical contact switch.

The input device 221 can be electrically connected to the electronic switch 220 to control the switch-on and off state of the electronic switch 220. The input device 221 can include a key switch, mechanical switch, potentiometer or sensors. When using the sensor, the sensor may be a pressure sensor, barometric pressure sensor, proximity sensor, electrostatic sensor, capacitive touch sensor or other sensing device. In the present embodiment, the input device 221 using the key press switch.

The power measurement device 222 is electrically connected to the power supply 21, for calculating the power of the power supply 21. In the present embodiment, the power measurement device 222 includes a current sampling device 222a. The current sampling device 222a may be configured to collect the current during discharge of the power source 21, the power measurement device 222 is used to obtain the collected current by the current sampling device 222a, calculate the current collected by the current sampling device 222a using integration, to obtain a current remaining power of the power source 21. Specifically, the current sampling device 222a can be a 0.01 ohm resistor. The current sampling device 222a may be connected in series to between the electrode 4 and the source 221 of the electronic switch 220.

The control device 225 can be electrically connected to the power supply 21, electronic switch 220, input device 221 and the indication device 223. In the present embodiment, the control device 225 may be a micro-controller, the power electrode VCC and the negative electrode BAT-VCC of the control device 225 are electrically connected, respectively, to the electrodes 2 and 3 of the power source 21 via the voltage regulator 9. The SDA pin and the SCL pin of the control device 225 are electrically connected to the interface 224 in order to transmit, to the interface 224, signals representing the collected currently remaining capacity and voltage of the power supply 21. The AD pin of the control device 225 is connected between the current sampling device 222a and the source 221 of the electronic switch 220 via the filter amplifier 8 to collect, at a high frequency, the current signals of the current sampling device 222a. IO4 pin of the control device 225 may be connected in series with the source 221 of the electronic switch 220 via the MOS driver 7. The IO5 pin of the control device 225 can be electrically connected to the input device 221. The IO0 through IO3 pins of the control device 225 can be electrically connected to the indication device 223. The input device 221 controls the switch on/off state of the electronic switch 220 by sending signals to the control device 225. In some embodiments, the control device 225 can be omitted. The to-be-powered device 10 can be directly connected to the power source 21 and the electronic switch 220. The gate 220c of the electronic switch 220 is directly connected in series with the input device 221.

The indication device 223 is electrically connected to the power measurement device 222 to indicate a percentage of the currently remaining charge of the power supply 21. The indication device 223 includes a plurality of indicator lights (not shown). The power measurement device 223 is also used to divide the currently remaining capacity of the power supply by a total capacity of the power supply to obtain a percentage of the currently remaining charge. The number of simultaneously-lit indicator lights corresponding to the percentage of the currently remaining capacity of the power supply. Specifically, in this embodiment, the indicating means 223 includes four power indicators, which are LED lights. One lit light indicates that the percentage of the remaining charge is 25%. When all four of the power indicator lights are on, it means that the battery 20 has 75-100% remaining charge. Three lit indicator lights means that the battery 20 has 50-75% remaining charge. Two lit indicator lights means that the battery 20 has 25-50% remaining charge. One lit indicator light means that the battery 20 has 0-25% remaining charge. This allows users to roughly understand how much remaining charge the battery has.

In other embodiments of the present invention, the indication device 223 includes a LCD monitor or other display device for indicating the current percentage of remaining charge.

The housing 23 includes a bottom casing 23a and a cover member 23b. The bottom casing 23a is formed by coupling two semi-rectangular casings 23c. The rectangular casing 23d has a venting opening. The power source 21 is disposed at the bottom of the bottom casing 23a. The cover member 23b seals the opening of the bottom casing 23. The electronic switch 220, input device 221, the power measurement device 222, indication device 223 and the interface 224 set on the circuit board 5. The circuit board 5 is connected to the power source 21 via the fixing plate 4. To facilitate guiding light for the indication device 223, the battery 20 further includes a light guide module 4, the light guide module 4 is made of transparent acrylic material, passing through the through hole of the cover member 23b and is affixed to the cover 23b, allowing the light from the indicator lights of the indication device 223 to pass through the cover 23b.

The present invention uses electronic switch to control the power on/off of the battery, thereby avoiding the generation of sparks during the power on process, ensuring the normal use of the battery and the safety of the aircraft. To facilitate operating the input device 221, the battery 20 further includes push buttons 3.

The battery described herein can calculate and display the present capacity of the battery, solving the problem of access to the present capacity of the battery. Further, the battery can be equipped with an interface, so that other electronic equipment can obtain the present status of the battery using the interface to implement further functionalities (e.g., for battery protection).

Figure 4:
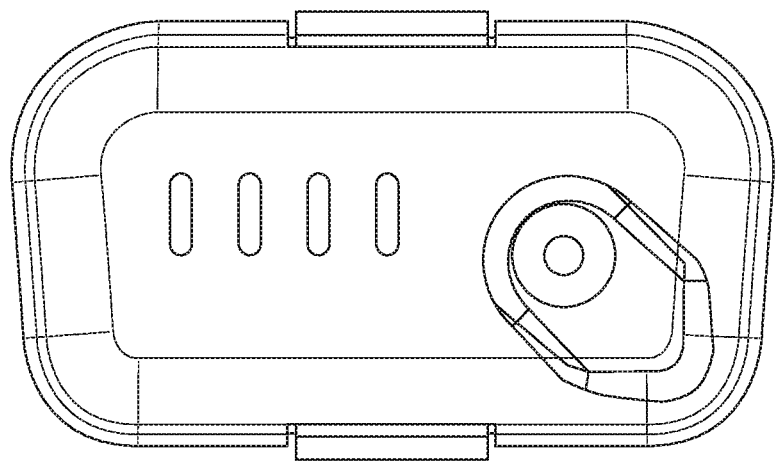
FIG. 4 shows a front view illustration of a battery of the disclosure.
Figure 5:
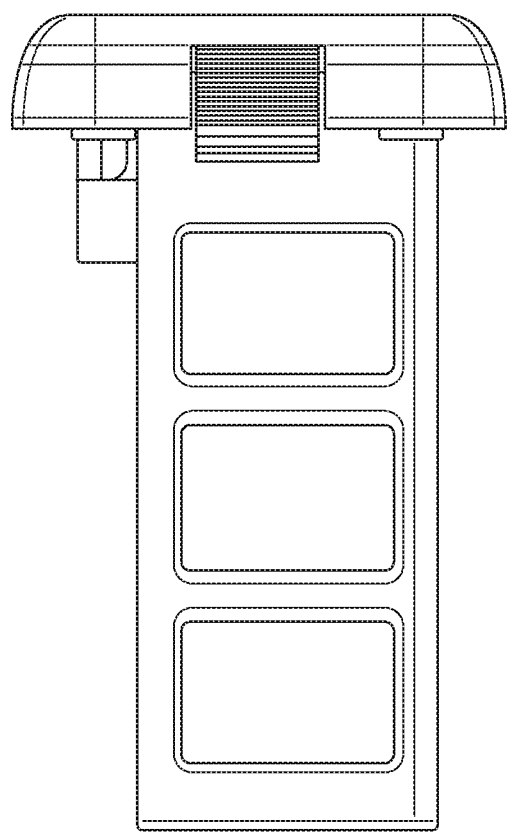
FIG. 5 shows a top view illustration of a battery of the disclosure.

FIG. 2 shows a perspective view of a power supply pack 20 in accordance with an embodiment of the invention. The power supply pack may have a housing that may partially or completely enclose a power supply and or a power supply circuit. The power supply pack may be a self contained package that may be inserted into a portion of a movable object, such as a UAV, and/or separated from the movable object. A bottom casing 23a may be provided as part of the housing. Optionally, the bottom casing may be inserted into the movable object and is not exposed upon insertion. In some embodiments, the power supply pack may have a cover member 23b that may form an exterior surface or side that may remain exposed even when the power supply pack is inserted or connected to the movable object. The cover member 23b may have one or more power level indicators, such as indicator lights and/or an input device 221 such as a button. In some embodiments, the power level indicator may remain visible so that a user can easily check the level of the power supply. The input device may remain accessible so that the user can interact with the input device without having to adjust the power supply pack. FIG. 3 provides an exploded view of the power supply pack. FIG. 4 provides a view of the cover member of the power supply pack. FIG. 5 provides a top view of the of the power supply pack.

In some embodiments, a power supply pack may be of a low weight. This may be advantageous for movable object applications, such as UAVs. In one example, the power supply pack may weigh less than about 1 gram, 5 grams, 10 grams, 15 grams, 20 grams, 25 grams, 30 grams, 35 grams, 40 grams, 45 grams, 50 grams, 60 grams, 70 grams, 80 grams, 90 grams, 100 grams, 120 grams, 150 grams, 200 grams, 250 grams, 300 grams, 330 grams, 340 grams, 350 grams, 375 grams, 400 grams, 450 grams, 500 grams, 600 grams, or 700 grams. In some embodiments, the housing of the power supply pack plus the weight of the power supply circuit may be less than about 1 gram, 5 grams, 10 grams, 15 grams, 20 grams, 25 grams, 30 grams, 35 grams, 40 grams, 45 grams, 50 grams, 60 grams, 70 grams, 80 grams, 90 grams, or 100 grams. Optionally, the weight of the power supply plus the power supply circuit may be less than 1 gram, 5 grams, 10 grams, 15 grams, 20 grams, 25 grams, 30 grams, 35 grams, 40 grams, 45 grams, 50 grams, 60 grams, 70 grams, 80 grams, 90 grams, 100 grams, 120 grams, 150 grams, 200 grams, 250 grams, 300 grams, 330 grams, 340 grams, 350 grams, 375 grams, 400 grams, 450 grams, or 500 grams. The weight of the housing of the power supply pack may be less than or equal to about 1 gram, 5 grams, 10 grams, 12 grams, 15 grams, 17 grams, 20 grams, 25 grams, 30 grams, 35 grams, 40 grams, 45 grams, 50 grams, 60 grams, 70 grams, 80 grams, 90 grams, or 100 grams. The ratio of the weight of the housing of the power supply pack plus the power supply circuit to the weight of the power supply may be less than or equal to about 1:50, 1:40, 1:30, 1:20, 1:15, 1:12, 1:11, 1:10, 1:9, 1:8, 1:7, 1:6, 1:5, 1:4, or 1:3. The power supply pack may include a MCU. The MCU may weigh less than or equal to about 0.01 grams, 0.05 grams, 0.1 grams, 0.5 grams, 0.7 grams, 0.8 grams, 0.9 grams, 1 gram, 2 grams, 3 grams, 5 grams, 7 grams, 10 grams, 15 grams, or 20 grams.

In some embodiments, the power supply pack may be coupled to a movable object. The movable object may be lightweight. For example, the movable object may be a UAV. A UAV may have longer battery life if the UAV and/or battery are lightweight. The movable object may be of a weight that can be carried in one hand or two hands by a human being. In some embodiments, the movable object, such as a UAV, may weigh less than about 100 grams, 150 grams, 200 grams, 250 grams, 300 grams, 500 grams, 750 grams, 1 kg, 1.1 kg, 1.2 kg, 1.3 kg, 1.4 kg, 1.5 kg, 1.7 kg, 2 kg, 2.5 kg, 3 kg, 4 kg, or 5 kg. In some embodiments, the movable object may weigh more than about 10 grams, 50 grams, 100 grams, 150 grams, 200 grams, 250 grams, 300 grams, 400 grams, 500 grams, 750 grams, 1 kg, 1.1 kg, 1.2 kg, or 1.3 kg. The weight of the movable object may include the weight of the movable object without the power supply, or may include the weight of the movable object with the power supply. The weight of the power supply may less than or equal to about 1 gram, 5 grams, 10 grams, 15 grams, 20 grams, 25 grams, 30 grams, 35 grams, 40 grams, 45 grams, 50 grams, 60 grams, 70 grams, 80 grams, 90 grams, 100 grams, 120 grams, 150 grams, 200 grams, 250 grams, 300 grams, 330 grams, 340 grams, 350 grams, 375 grams, 400 grams, 450 grams, or 500 grams. The ratio of the weight of the power supply to the weight of the movable object may be less than or equal to about 1:30, 1:20, 1:15, 1:12, 1:11, 1:10, 1:9, 1:8, 1:7, 1:6, 1:5, 1:4, 1:3, or 1:2. The ratio of the weight of the power supply pack to the weight of the movable object may be less than or equal to about 1:30, 1:20, 1:15, 1:12, 1:11, 1:10, 1:9, 1:8, 1:7, 1:6, 1:5, 1:4, 1:3, or 1:2. The ratio of the weight of the power supply housing plus the power supply circuit to the weight of the movable object may be less than or equal to about less than or equal to about 1:100, 1:70, 1:50, 1:40, 1:30, 1:20, 1:15, 1:12, 1:11, 1:10, 1:9, 1:8, 1:7, 1:6, 1:5, or 1:4.

Figure 6:
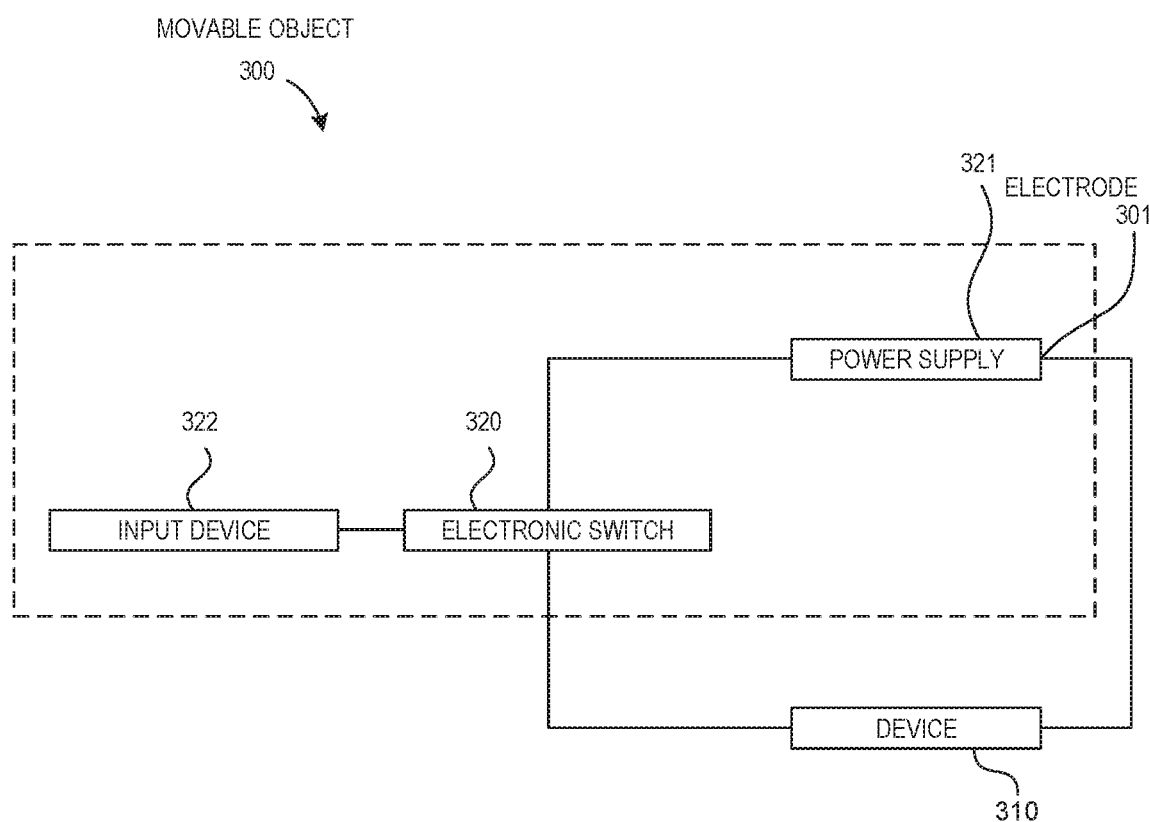
FIG. 6 is a schematic circuit diagram of a vehicle of the disclosure.

Referring to FIG. 6, a movable object 300, such as a vehicle (e.g., UAV), is provided in accordance with another embodiment of the invention. The movable object 300 may be similar to the movable object 100 of other embodiments. Optionally, the to-be-powered device 310 may be directly connected between an electrode 301 of the power supply 321 couple to the electronic switch 320. The electronic switch 320 may be directly or indirectly controlled by the input device 321.

Figure 7:
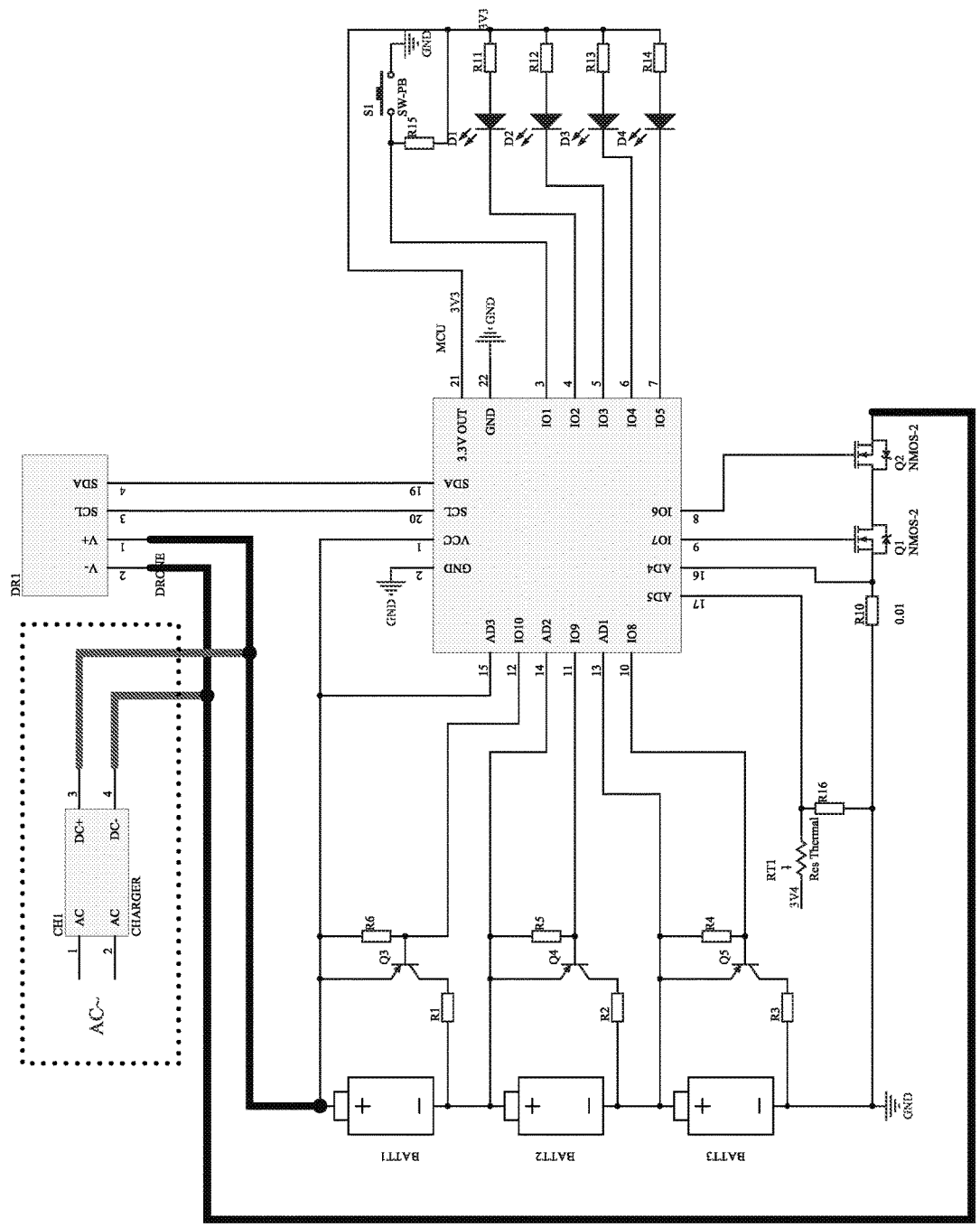
FIG. 7 is a schematic diagram of a circuit board of the disclosure.

The power supply pack of the present disclosure can be equipped with a multi-functional circuit board. Many features can be achieved by design of the circuit board. FIG. 7 shows a schematic drawing of the system schematic. The BATT1 705, BATT2 710, BATT3 715 on the left may be three separate battery cores, the dotted lined portion may be an external charger 720, and DR1 may be electrical equipment to be powered 725. The remaining part may be the schematic of the multi-functional circuit board of the power supply pack. The power supply pack can be designed such that at any given moment, it can only be connected to the electrical equipment or the charger. For example, at a given moment, it may either be connected to a movable object or may be connected to a charger. Alternatively, the power supply pack may be configured so that it can be connected to a charger while also connected to the movable object.

Without limitation, the circuit board can be used to achieve any one or more of the following nine functions: (a) discharge control, (b) charge calculation, (c) indication of charge percentage, (d) short circuit protection, (e) overcharge protection, (f) over discharge protection, (g) core voltage balancing, (h) communication with other devices, and (i) charging temperature protection. Further description is provided for each of the nine functions of the circuit board. In some instances, the circuit board may include an MCU that may be capable of performing one or more of the nine functions described. In some instances, the MCU may be capable of performing, two or more, three or more, four or more, five or more, six or more, seven or more, eight or more, or all nine of the functions described. The MCU may be able to effect any combination of the nine functions, such as but not limited to: (a) discharge control and (b) charge calculation, (d) short circuit protection and (e) overcharge protection, (a) discharge control and (c) indication of charge percentage, (a) discharge control and (d) short circuit protection, (a) discharge control and (e) over discharge protection, or any other combinations of the functions.

Discharge control can be achieved with the circuit board. As shown in FIG. 7, the circuit board can be equipped with a button S1 730, a processor MCU 735, a discharge control MOSFET Q1 740, and a charge control MOSFET Q2 745. In the off state, Q1 is closed and Q2 is open. The process for discharge control can be as follows: when the MCU detects that the key S1 is pressed, the MCU determines whether the signal from S1 indicates that the user wishes to turn on the battery. If yes, then the MCU controls Q1 and Q2. Thus, the negative electrode of the battery pack is connected to the negative electrode of the electrical equipment, allowing the electrical equipment to work. That is, the battery begins external output. Conversely, if the MCU detects that the signal from S1 indicates that the user wants to shut down the battery, then the MCU will close Q1 to cut off the negative wire between the battery and electrical equipment, so that electrical equipment stops working.

Charge calculation can be achieved with the circuit board. Battery charge refers to the total charge the battery can output, often expressed in units of Ampere-hours. To determine the charge of the battery inside, a current sampling circuit can be used. As shown in FIG. 7, the resistor R10 750 is a sensor used to sample the size of current along the negative electrode line. The MCU can include a module for converting analog signals to digital signals, wherein AD4 755 is an input pin of the analog-to-digital conversion module. AD4 can collect the voltage of the resistor, and calculate the current in accordance with the relationship between voltage and current (i.e., I=V/R, where I is current, V is voltage and R is resistance). The relationship between charge and current is Q=I*t, where Q is charge, I is current and t is time. The MCU can periodically collect the signal, for example, once every t time. The change in charge during the charge or discharge process is $Q_1=\Sigma I*t$, assuming the original battery capacity is $Q_0$, then the charge is $Q=Q_1+Q_0$. If the battery's total capacity is $Q_{ALL}$, then, the percentage of current charge is $P=Q_{ALL}/Q$.

Charge percentage indication can be achieved with the circuit board. The multi-functional protective board can calculate the percentage of currently remaining charge. In some embodiments, the charge information is displayed to the user. When the MCU 735 detects, based on the signals from S1 730, that the user wants to check the charge, then the MCU can control the on and/or off of the LED lights D1~D4 760 to indicate the range of the current charge. For example, if only the leftmost LED light is lit, then about 25% of the charge remains. If the leftmost two LED lights are lit, then about 50% of the charge remains, and so on. Therefore, the user can determine the percentage of remaining charge by viewing the status of LED lights.

Short circuit protection can be achieved with the circuit board. When the power supply output short circuits, the current can be between about 100 amps and 200 amps. Therefore, a short circuit has occurred when the current is greater than about 100 amps. A threshold current value may be provided (e.g., 30 amps, 40 amps, 50 amps, 60 amps, 70 amps, 80 amps, 90 amps, or 100 amps). If the threshold current value is exceeded the power supply discharge may be stopped. The power supply discharge may be stopped via use of the electronic switch. In such a case, the power supply output is shut off to prevent fire, explosion, or other issues caused by the battery short circuit. An embodiment is shown in FIG. 7, the resistor R10 750 is used to collect the current along the negative electrode line and AD4 755 can convert the current signal to digital signals understood by the MCU 735. When the AD4 detects that the current is more than a predetermined current, the MCU will close Q1 740 in order to protect the battery.

Overcharge protection can be achieved with the circuit board. In some cases, the battery can deteriorate quickly when overcharged. One of the most direct indications of overcharge is that the voltage of a given core is higher than the maximum voltage of the same type of battery. In this case, charging of the core is stopped to protect the core. As shown in FIG. 7, AD1 760, AD2 765, AD3 770, can be calculated from the voltage of each respective battery core. If the voltage of a given battery core is higher than the prescribed voltage, the MCU 735 can cut off Q2 745 to stop charging.

Over discharge protection can be achieved with the circuit board. In some cases, the battery can deteriorate quickly if discharged below a certain voltage (i.e., over-discharge). The battery can be shut down when the voltage of the battery reaches the over-discharge voltage. As shown in FIG. 7, AD1 760, AD2 765, AD3 770 can detect the voltage of each cell/core, if the voltage of a given battery reaches the over-discharge voltage, the MCU 735 closes Q1 740 to cut off the output of the external battery to achieve protection of the battery.

Cell voltage balancing can be achieved with the circuit board. Since each cell has slightly different parameters, especially in the case of prolonged use, the voltage of each cell can be inconsistent. In such cases, the battery can gradually become severely imbalanced, and the battery capacity can decline and/or the total discharge voltage of the battery can be reduced, seriously affect the battery performance. To this end, the voltage of each cell can be controlled within a reasonable range. As shown in FIG. 7, AD1 760, AD2 765, and AD3 770 can measure the voltage of each cell V1, V2, and V3, respectively. When V1, V2, or V3 exceeds a certain value, the given cell can be discharged without discharge of the others via a transistor and resistor connected to the battery so as to reduce the voltage of the given cell to be similar to that of the other cells, thereby achieving a balance among the batteries.

Communication with other devices can be achieved with the circuit board. A communication interface can be set up for the battery pack, SDA 775 and SCL 780. This can be a set of standard I²C communication interfaces for communicating with external devices. The communication interface can transmit the charge of the battery, the percentage of power, current, voltage, temperature and other information to other devices (e.g., so that the other devices can obtain the current state of the battery in real time).

Charging temperature protection can be achieved with the circuit board. In some cases, the optimal charging temperature for the batteries ranges from 0 degrees Celsius to 45 degrees Celsius. Charging the batteries beyond this temperature range can slowly damage the batteries. Therefore, as shown in FIG. 7, a temperature sensor RT1 785 can measure the ambient temperature and express temperature changes as voltage changes. The voltage can be collected by AD5 790 and converted to temperature by the MCU 735. When the temperature detected by the MCU falls outside the allowable charging temperature range, the MCU can turn off the Q2 745 to stop charging.

The MCU can collect press-key input signals. In order to prevent user errors, mechanisms may be provided for preventing false triggering by users. When the battery is shut down, the MCU can control the switch-off of the electronic switch (e.g., MOSFET) via the corresponding IO pin 795. When the key is pressed for the first time, the MCU can control the LED lights to display the battery power. If the key is pressed again within 2 seconds and remains pressed for at least 2 seconds, the MCU can determine that the user wants to turn on the battery. Therefore, the MCU can control the MOSFET to the output state via the corresponding IO pins connected to the MOSFET. In response, the battery starts discharging. In some cases, implementation of the described embodiments adds about 20 grams to a 300 gram battery.

The electronic device installed with the battery (as shown in FIG. 7) can use an electronic switch, such as a power MOSFET, as the control element for battery discharge (i.e., the equivalent of a solid state relay). Since solid state relays are non-contact relays, no spark is generated during the on-off state switching process. The electronic device is also equipped with buttons and other input elements, and computer processor. A user can input operation information via the buttons. The signal collected by the processor can be used to control the on or off of the MOSFET, in order to achieve control of the battery discharge. Switches and other similar elements can be used to directly control the on or off of the MOSFET to achieve power on without generation of sparks.

With this battery, problems related to burning and erosion of interface locations by sparks and the resulting increased resistance and poor connection are addressed, so that the system can provide a stable power supply.

Figure 8:
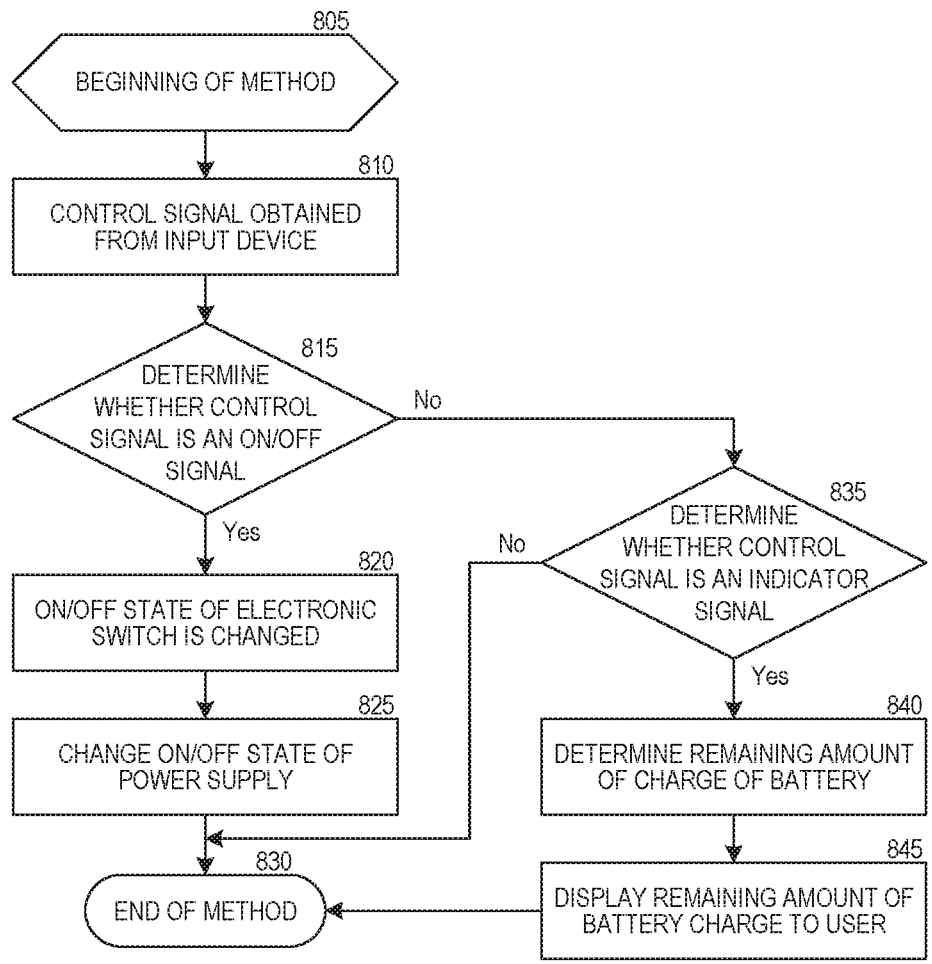
FIG. 8 is a flow-chart showing the steps of a method of the disclosure.

A flow-chart showing a method for operating the power supply is shown in FIG. 8. At the beginning of the method 805, a control signal is obtained from an input device (e.g., a button) 810. The control signal can be relayed to a decision point 815 where it can be determined whether the control signal is an on/off signal. If the control signal is an on/off signal, the on/off state of the electronic switch is changed 820 (e.g., from off to on, or from on to off). Changing the on/off state of the electronic switch then changes the on/off state of the power supply 825. The method can then end 830 until another control signal is obtained from the input device 805. If it is determined that the control signal is not an on/off signal, it can then be determined whether the control signal is an indicator signal 835 (e.g., the level of charge of the power supply is desired to be displayed). If the control signal is not an indicator signal, the method can be ended 830. If the control signal is an indicator signal, the remaining amount of charge of the battery can be determined 840 and displayed to the user 845 (e.g., by lighting 1, 2, 3 or 4 LED lights).

A power supply system may be capable of operating in one or more modes. In some instances, a plurality of operational modes may be presented for a power supply system. Different operational modes may cause different actions to be taken by a power supply pack. A user may be able to switch between the different operational modes by providing an input. The input may be provided to an input device of the power supply pack. For example, a user may depress a button on the power supply pack. Pressing the button may switch the operational mode of the power supply pack. The input may be provided manually and directly by the user. In another example, a user may provide an input to a remote control that may communicate with an input device of the power supply pack. The input may be provided indirectly by a user that need not interact manually with the input device. The user input may be indicative of which operational mode to switch to, or may provide an indication to switch to a next operational mode in a sequence of operational modes.

In one example, a plurality of operational modes may be available for a power supply system. Providing a user input, such as a depression of an input device, may cause the power supply pack to cycle to the next operational mode in a series of operational modes. Optionally, when a power supply pack is first powered on or connected to a movable object, a default operational mode may be provided. A predetermined sequence of operational modes may be provided. A user may step to the next operational mode in the sequence by providing a user input. For example, the predetermined sequence may include Operational Mode A, Operational Mode B, Operational Mode C, and Operational Mode D which may cycle in order. If the power supply system is currently operating under Operational Mode B, an input from a user may step to the next operational mode, Operational Mode C. For example, a user may depress a button input device to move to the next operational mode. Alternatively, a predetermined sequence need not be provided, or a user may be able to skip between desired operational modes by providing an input indicative of the desired operational mode. For example, a user may be presented with a menu of options (e.g., Operational Mode A, Operational Mode B, Operational Mode C, and Operational D) and select the desired operational mode from the options.

Various example of operational modes may include a mode of activating a display of a level of charge of the power supply, turning on or turning off the power supply by turning on or off an electronic switch in electrical communication with the power supply, communicating with an external device (e.g., providing state information associated with the power supply to an external device, receiving information from the external device), comparing an input signal with a predetermined signal pattern, or any other functions. In some instances, two or more, three or more, four or more, five or more, or six or more operational modes may be provided.

In response to an input signal, the power supply pack may switch between different operational modes. In response to the input signal, an operational mode may be selected from a plurality of operational modes associated with the power supply. In some instances, the operational mode may be switched or selected based on a characteristic associated with the input signal. For example, the characteristic may include a length of time of the input signal. In another example, the characteristic may include the data conveyed in the input signal. The characteristic may include a pattern provided in the input signal. For example, if an input device is a button, depressing the button once quickly vs. holding it down for a long period of time may be different characteristics that may yield a switch to or selection of a different operational mode. For example, a quick depression of the button may cause the operational mode to switch between powering on and powering off. Holding the button down for an extended period of time may cause a level of charge of the power supply to be displayed or turned off.

The systems, devices, and methods described herein can be applied to a wide variety of movable objects. As previously mentioned, any description herein of an aerial vehicle such as UAV may apply to and be used for any movable object. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The actuation mechanism may be powered by a power supply as described herein. The power supply may optionally be coupled to a power supply circuit. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being. The propulsion unit may be powered by a power supply controlled by a power supply circuit as described elsewhere herein.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less. The movable object, carrier, and or payload may be powered by a power supply as described elsewhere herein.

Figure 9:
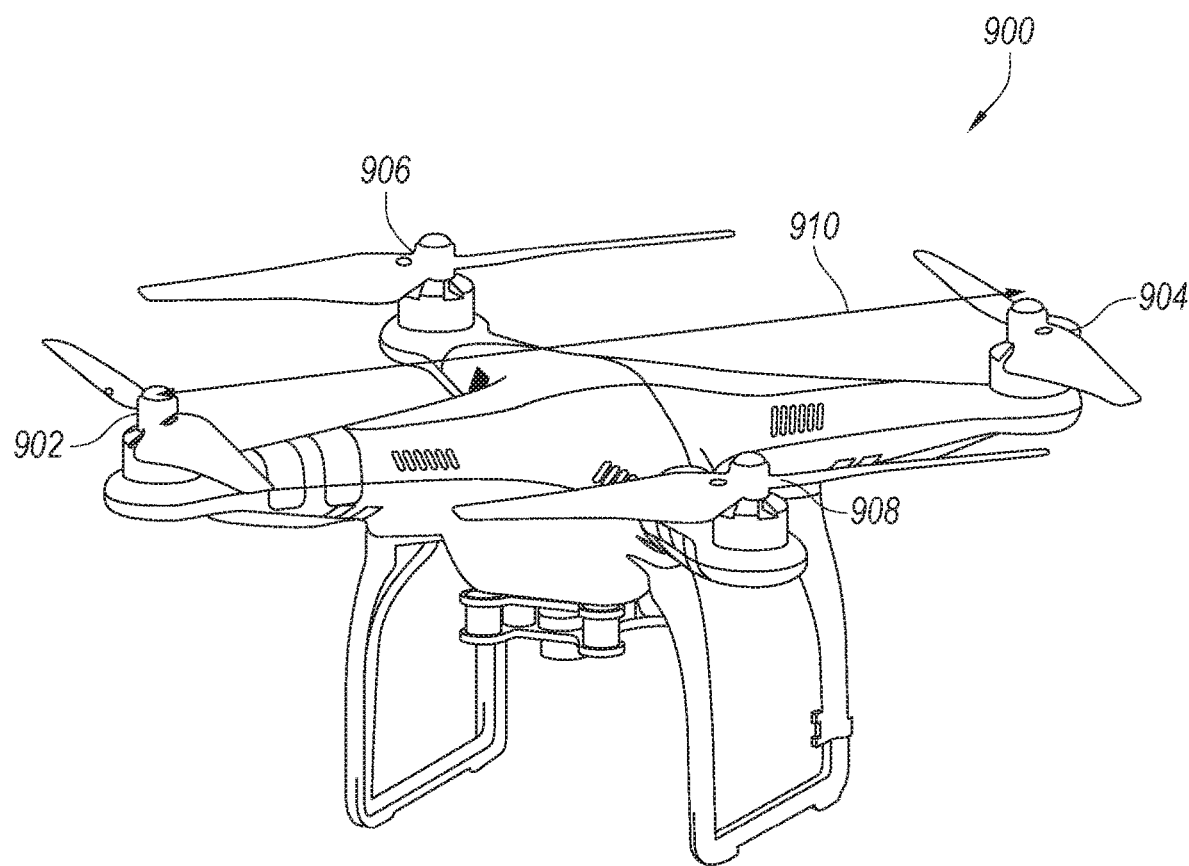
FIG. 9 illustrates an unmanned aerial vehicle, in accordance with embodiments.

FIG. 9 illustrates an unmanned aerial vehicle (UAV) 900, in accordance with embodiments of the present invention. The UAV may be an example of a movable object as described herein. The UAV 900 can include a propulsion system having four rotors 902, 904, 906, and 908. Any number of rotors may be provided (e.g., one, two, three, four, five, six, or more). The rotors can be embodiments of the self-tightening rotors described elsewhere herein. The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 910. For example, the length 910 can be less than or equal to 2 m, or less than equal to 5 m. In some embodiments, the length 910 can be within a range from 40 cm to 7 m, from 70 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for an movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can also be used to control any state of a power supply and/or operation of a power supply pack. For example, the terminal can be used to select or alter an operational mode of a power supply pack. The terminal can be used to remotely turn a power supply on or off, or control charge or discharge of the power supply. The terminal can be used to cause a display of a level of charge for the power supply. Optionally, the level of charge for the power supply can be displayed on a power supply pack, and/or on the terminal. The terminal can include a wireless communication device adapted to communicate with the power supply pack.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 10:
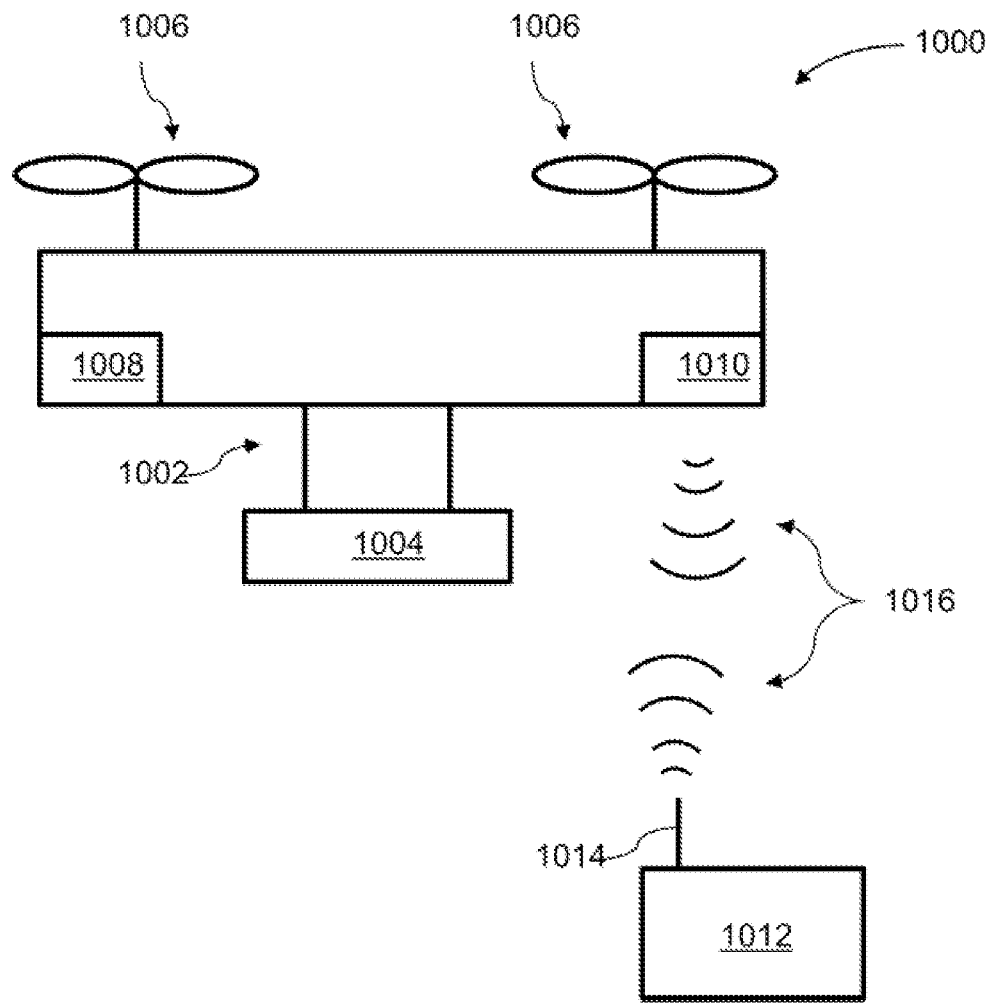
FIG. 10 illustrates a movable object including a carrier and a payload, in accordance with embodiments.

FIG. 10 illustrates a movable object 1000 including a carrier 1002 and a payload 1004, in accordance with embodiments. Although the movable object 1000 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1004 may be provided on the movable object 1000 without requiring the carrier 1002. The movable object 1000 may include propulsion mechanisms 1006, a sensing system 1008, and a communication system 1010.

The propulsion mechanisms 1006 can include one or more of rotors, propellers, blades, engines, motors, wheels, axles, magnets, or nozzles, as previously described. For example, the propulsion mechanisms 1006 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1006 can be mounted on the movable object 1000 using any suitable means, such as a support element (e.g., a drive shaft) as described elsewhere herein. The propulsion mechanisms 1006 can be mounted on any suitable portion of the movable object 1000, such on the top, bottom, front, back, sides, or suitable combinations thereof.

In some embodiments, the propulsion mechanisms 1006 can enable the movable object 1000 to take off vertically from a surface or land vertically on a surface without requiring any horizontal movement of the movable object 1000 (e.g., without traveling down a runway). Optionally, the propulsion mechanisms 1006 can be operable to permit the movable object 1000 to hover in the air at a specified position and/or orientation. One or more of the propulsion mechanisms 1000 may be controlled independently of the other propulsion mechanisms. Alternatively, the propulsion mechanisms 1000 can be configured to be controlled simultaneously. For example, the movable object 1000 can have multiple horizontally oriented rotors that can provide lift and/or thrust to the movable object. The multiple horizontally oriented rotors can be actuated to provide vertical takeoff, vertical landing, and hovering capabilities to the movable object 1000. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1000 (e.g., with respect to up to three degrees of translation and up to three degrees of rotation).

The sensing system 1008 can include one or more sensors that may sense the spatial disposition, velocity, and/or acceleration of the movable object 1000 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1008 can be used to control the spatial disposition, velocity, and/or orientation of the movable object 1000 (e.g., using a suitable processing unit and/or control module, as described below). Alternatively, the sensing system 1008 can be used to provide data regarding the environment surrounding the movable object, such as weather conditions, proximity to potential obstacles, location of geographical features, location of manmade structures, and the like.

The communication system 1010 enables communication with terminal 1012 having a communication system 1014 via wireless signals 1016. The communication systems 1010, 1014 may include any number of transmitters, receivers, and/or transceivers suitable for wireless communication. The communication may be one-way communication, such that data can be transmitted in only one direction. For example, one-way communication may involve only the movable object 1000 transmitting data to the terminal 1012, or vice-versa. The data may be transmitted from one or more transmitters of the communication system 1010 to one or more receivers of the communication system 1012, or vice-versa. Alternatively, the communication may be two-way communication, such that data can be transmitted in both directions between the movable object 1000 and the terminal 1012. The two-way communication can involve transmitting data from one or more transmitters of the communication system 810 to one or more receivers of the communication system 1014, and vice-versa.

In some embodiments, the terminal 1012 can provide control data to one or more of the movable object 1000, carrier 1002, and payload 1004 and receive information from one or more of the movable object 1000, carrier 1002, and payload 1004 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1006), or a movement of the payload with respect to the movable object (e.g., via control of the carrier 1002). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1008 or of the payload 1004). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1012 can be configured to control a state of one or more of the movable object 1000, carrier 1002, or payload 1004. Alternatively or in combination, the carrier 1002 and payload 1004 can also each include a communication module configured to communicate with terminal 1012, such that the terminal can communicate with and control each of the movable object 1000, carrier 1002, and payload 1004 independently.

In some embodiments, the movable object 1000 can be configured to communicate with another remote device in addition to the terminal 1012, or instead of the terminal 1012. The terminal 1012 may also be configured to communicate with another remote device as well as the movable object 1000. For example, the movable object 1000 and/or terminal 1012 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1000, receive data from the movable object 1000, transmit data to the terminal 1012, and/or receive data from the terminal 1012. Optionally, the remote device can be connected to the Internet or other telecommunications network, such that data received from the movable object 1000 and/or terminal 1012 can be uploaded to a website or server.

Figure 11:
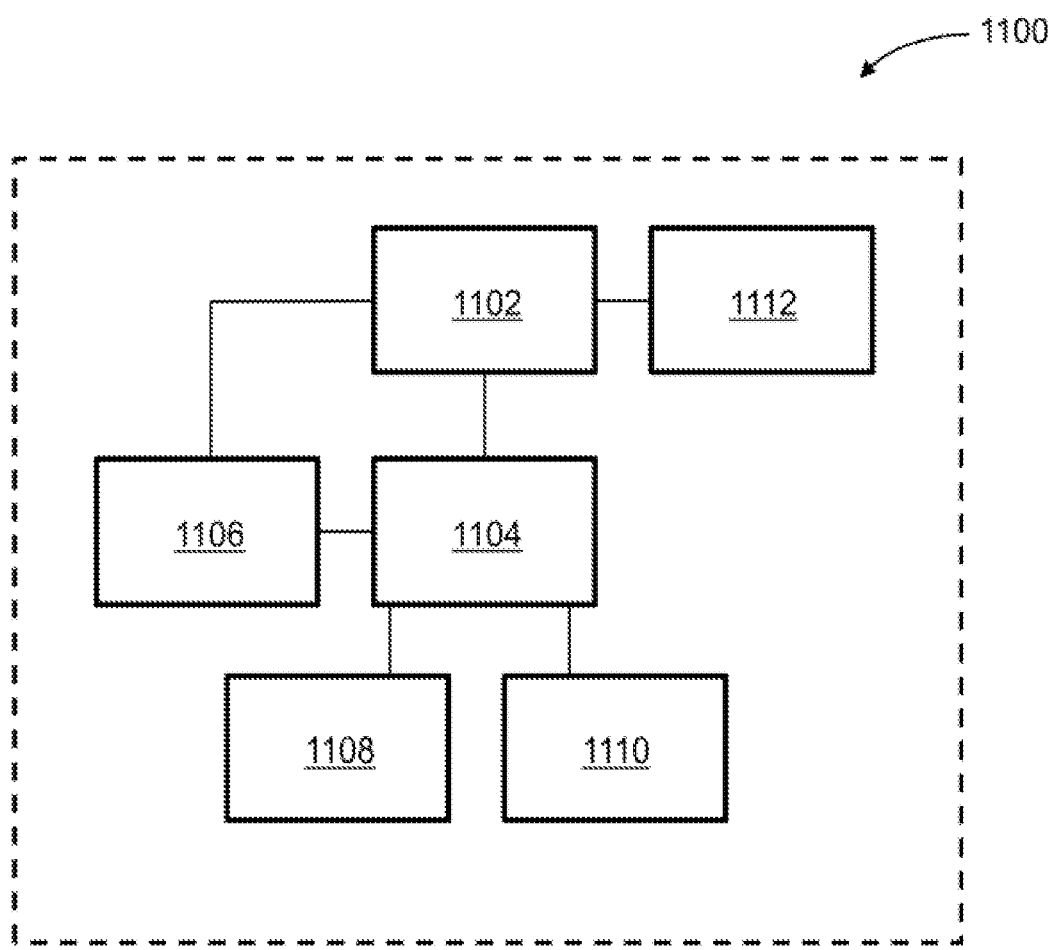
FIG. 11 is a schematic illustration by way of block diagram of a system for controlling a movable object, in accordance with embodiments.

FIG. 11 is a schematic illustration by way of block diagram of a system 1100 for controlling a movable object, in accordance with embodiments. The system 1100 can be used in combination with any suitable embodiment of the systems, devices, and methods disclosed herein. The system 1100 can include a sensing module 1102, processing unit 1104, non-transitory computer readable medium 1106, control module 1108, and communication module 1110.

The sensing module 1102 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1102 can be operatively coupled to a processing unit 1104 having a plurality of processors. In some embodiments, the sensing module can be operatively coupled to a transmission module 1112 (e.g., a Wi-Fi image transmission module) configured to directly transmit sensing data to a suitable external device or system. For example, the transmission module 1112 can be used to transmit images captured by a camera of the sensing module 1102 to a remote terminal.

The processing unit 1104 can have one or more processors, such as a programmable processor (e.g., a central processing unit (CPU)). The processing unit 1104 can be operatively coupled to a non-transitory computer readable medium 1106. The non-transitory computer readable medium 1106 can store logic, code, and/or program instructions executable by the processing unit 1104 for performing one or more steps. The non-transitory computer readable medium can include one or more memory units (e.g., removable media or external storage such as an SD card or random access memory (RAM)). In some embodiments, data from the sensing module 1102 can be directly conveyed to and stored within the memory units of the non-transitory computer readable medium 1106. The memory units of the non-transitory computer readable medium 1106 can store logic, code and/or program instructions executable by the processing unit 1104 to perform any suitable embodiment of the methods described herein. For example, the processing unit 1104 can be configured to execute instructions causing one or more processors of the processing unit 1104 to analyze sensing data produced by the sensing module. The memory units can store sensing data from the sensing module to be processed by the processing unit 1104. In some embodiments, the memory units of the non-transitory computer readable medium 1106 can be used to store the processing results produced by the processing unit 1104.

In some embodiments, the processing unit 1104 can be operatively coupled to a control module 1108 configured to control a state of the movable object. For example, the control module 1108 can be configured to control the propulsion mechanisms of the movable object to adjust the spatial disposition, velocity, and/or acceleration of the movable object with respect to six degrees of freedom. Alternatively or in combination, the control module 1108 can control one or more of a state of a carrier, payload, or sensing module.

The processing unit 1104 can be operatively coupled to a communication module 1110 configured to transmit and/or receive data from one or more external devices (e.g., a terminal, display device, or other remote controller). Any suitable means of communication can be used, such as wired communication or wireless communication. For example, the communication module 1110 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1110 can transmit and/or receive one or more of sensing data from the sensing module 1102, processing results produced by the processing unit 1104, predetermined control data, user commands from a terminal or remote controller, and the like.

The components of the system 1100 can be arranged in any suitable configuration. For example, one or more of the components of the system 1100 can be located on the movable object, carrier, payload, terminal, sensing system, or an additional external device in communication with one or more of the above. Additionally, although FIG. 11 depicts a single processing unit 1104 and a single non-transitory computer readable medium 1106, one of skill in the art would appreciate that this is not intended to be limiting, and that the system 1100 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1100 can occur at one or more of the aforementioned locations.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A power supply assembly, comprising:
   a power supply configured to power an aerial vehicle;
   a power supply circuit connected to the power supply and carried by the power supply, wherein the power supply is configured to discharge through the power supply circuit to power the aerial vehicle, and wherein the power supply circuit includes—
      an electronic switch in electrical communication with the power supply and having (a) a switch-on state that permits discharge of power from the power supply to the aerial vehicle and (b) a switch-off state that prevents discharge of power from the power supply to the aerial vehicle;
      a power measurement device in electrical communication with the power supply; and
      an indication device in electrical communication with the power measurement device, wherein the indication device is configured to display a level of charge of the power supply (a) without requiring the power supply to be connected to the aerial vehicle and (b) without requiring the electronic switch to be in the switch-on state; and
   a single input device carried by the power supply and in electrical communication with the electronic switch and the indication device, wherein the input device is configured to receive at least (a) a first input from a user of the aerial vehicle for changing at least one of the switch-on or the switch-off state of the switch and (b) a second input from the user of the aerial vehicle for displaying the level of charge of the power supply via the indication device.

2. The power supply assembly of claim 1 wherein the input device is configured to receive the first input for changing the switch-on state of the electronic switch to the switch-off state.

3. The power supply assembly of claim 1 wherein the power measurement device includes a current sampling device configured to detect a current signal during charging or discharging of the power supply, and wherein the power measurement device is configured to calculate the level of charge of the power supply by sampling and integrating the current signal over a period of time at a predetermined frequency.

4. The power supply assembly of claim 3 wherein the current sampling device is configured to collect current during the discharging of the power supply.

5. The power supply assembly of claim 3 further comprising an interface configured to provide access to the level of charge of the power supply and voltage of the power supply.

6. The power supply assembly of claim 1 wherein the input device is selected from the group consisting of a key switch, a mechanical switch, a potentiometer, a pressure sensor, and a touch sensor.

7. The power supply assembly of claim 6 wherein the first input includes an actuation of the input device for a first time, and wherein the second input includes an actuation of the input device for a second time, different than the first time.

8. The power supply assembly of claim 7 wherein the first time is longer than the second time.

9. The power supply assembly of claim 1 wherein the input device includes a button, wherein the first input includes a depression of the button for a first time, and wherein the second input includes a depression of the button for a second time, different than the first time.

10. The power supply assembly of claim 9 wherein the first time is longer than the second time.

11. The power supply assembly of claim 1 wherein the electronic switch includes one of a power MOSFET, a solid state relay, a power transistor, or an insulated gate bipolar transistor (IGBT).

12. The power supply assembly of claim 1 wherein the electronic switch is a power MOSFET.

13. The power supply assembly of claim 1 wherein the power supply and power supply circuit weigh less than about 450 grams.

14. The power supply assembly of claim 1, wherein the aerial vehicle is an unmanned aerial vehicle (UAV).

15. A power supply assembly for an aerial vehicle, comprising:
a housing including a bottom casing and a cover member, wherein the cover member is positioned to cover an opening of the bottom casing, wherein the bottom casing is configured to be inserted into the aerial vehicle, wherein the cover member forms a portion of an exterior surface of the aerial vehicle when the bottom casing is inserted into the aerial vehicle, and wherein the bottom casing is not exposed at the exterior surface of the aerial vehicle when the bottom casing is inserted into the aerial vehicle;
a power supply configured to power the aerial vehicle, wherein the power supply is disposed in the bottom casing;
an indication device carried by the cover member; and
a single input device carried by the power-cover member and configured to—
receive input signals from a user of the aerial vehicle, wherein the input signals include at least (a) a first input signal indicative of a first operational mode and (b) a second input signal indicative of a second operational mode; and
enable switching between a plurality of operational modes based on the received input signals, wherein the operational modes include at least the first operational mode and the second operational mode,
wherein the first operational mode includes activating display of a level of charge of the power supply on the indication device, and wherein the second operational mode includes at least one of (a) connecting the power supply from the aerial vehicle by turning on an electronic switch in electrical communication with the power supply, or (b) disconnecting the power supply from the aerial vehicle by turning off the electronic switch in electrical communication with the power supply,
wherein the indication device is configured to display the level of charge of the power supply in response to receipt of the first input signal, (a) without requiring the power supply to be connected to the aerial vehicle and (b) without requiring the electronic switch to be turned on.

16. The power supply assembly of claim 15 wherein the plurality of operational modes further includes a third operational mode that includes communicating with an external device.

17. The power supply assembly of claim 15 wherein the first input signal has a first characteristic, and wherein the second input signal has a second characteristic, different than the first characteristic.

18. The power supply assembly of claim 17 wherein the first and second characteristics are different lengths of time of the input signal.

19. The power supply assembly of claim 17 wherein the first and second characteristics are different patterns provided in the input signals.

20. A system, comprising:
an unmanned aerial vehicle having a propulsion unit including at least one rotatable blade;
a power supply assembly including—
a housing including a bottom casing and a cover member, wherein the cover member is positioned to cover an opening of the bottom casing, wherein the bottom casing is configured to be inserted into the unmanned aerial vehicle, wherein the cover member forms a portion of an exterior surface of the unmanned aerial vehicle when the bottom casing is inserted into the unmanned aerial vehicle, and wherein the bottom casing is not exposed at the exterior surface of the unmanned aerial vehicle when the bottom casing is inserted into the unmanned aerial vehicle;
a power supply configured to power the propulsion unit of the unmanned aerial vehicle, wherein the power supply is disposed in the bottom casing;
a power supply circuit connected to the power supply, wherein the power supply is configured to discharge through the power supply circuit to power the propulsion unit of the unmanned aerial vehicle to rotate the at least one rotatable blade to generate lift for the unmanned aerial vehicle, and wherein the power supply circuit includes—
a power MOSFET in electrical communication with the power supply and having (a) a switch-on state that permits discharge of power from the power supply to the propulsion unit of the aerial vehicle and (b) a switch-off state that prevents discharge of power from the power supply to the propulsion unit of the aerial vehicle;
a power measurement device in electrical communication with the power supply; and
a plurality of light-emitting diodes (LEDs) carried by the cover member and in electrical communication with the power measurement device, wherein the LED lights are configured to display a level of charge of the power supply (a) without requiring the power supply to be connected to the aerial vehicle and (b) without requiring the power MOSFET to be in the switch-on state; and a single button carried by the cover member and in electrical communication with the power MOSFET and the LED lights, wherein the button is configured to be depressed (a) for a first length of time for changing at least one of the switch-on or the switch-off state of the power MOSFET and (b) for a second length of time, different than the first length of time, for displaying the level of charge of the power supply via the LED lights.

* * * * *